United States Patent
Miyasa et al.

(10) Patent No.: US 9,953,423 B2
(45) Date of Patent: Apr. 24, 2018

(54) IMAGE PROCESSING APPARATUS, IMAGE PROCESSING METHOD, AND STORAGE MEDIUM FOR IMAGE PROCESSING BASED ON PRIORITY

(71) Applicant: CANON KABUSHIKI KAISHA, Tokyo (JP)

(72) Inventors: Kazuhiro Miyasa, Yokohama (JP); Ryo Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 15/016,453

(22) Filed: Feb. 5, 2016

(65) Prior Publication Data
US 2016/0239950 A1 Aug. 18, 2016

(30) Foreign Application Priority Data
Feb. 13, 2015 (JP) .................. 2015-026965

(51) Int. Cl.
| | |
|---|---|
| G06T 3/00 | (2006.01) |
| G06K 9/36 | (2006.01) |
| G06T 7/00 | (2017.01) |
| G06T 7/33 | (2017.01) |
| G06K 9/46 | (2006.01) |
| G06K 9/62 | (2006.01) |

(52) U.S. Cl.
CPC ............ *G06T 7/003* (2013.01); *G06K 9/4604* (2013.01); *G06K 9/4671* (2013.01); *G06K 9/6211* (2013.01); *G06T 7/337* (2017.01)

(58) Field of Classification Search
CPC ... G06T 7/30–7/38; G06T 2207/20221; A61B 2090/365; A61B 6/5235
See application file for complete search history.

(56) References Cited

U.S. PATENT DOCUMENTS

| | | | |
|---|---|---|---|
| 6,226,418 B1 * | 5/2001 | Miller ................. | G06K 9/6206 382/131 |
| 7,409,108 B2 * | 8/2008 | Xu ..................... | G06K 9/00208 382/220 |

(Continued)

FOREIGN PATENT DOCUMENTS

JP 2009-160045 A 7/2009

OTHER PUBLICATIONS

U.S. Appl. No. 14/972,559, filed Dec. 17, 2015, Inventor Ryo Ishikawa.

*Primary Examiner* — Brian Werner
(74) *Attorney, Agent, or Firm* — Carter, DeLuca, Farrell & Schmidt LLP

(57) ABSTRACT

An image processing apparatus includes: a feature point obtaining unit configured to obtain priority feature points that are registered preferentially and nonpriority feature points that have priority orders lower than those of the priority feature points to be registered; a weight setting unit configured to set a weight of each of the nonpriority feature points based on an evaluation value that evaluates a characteristic of the nonpriority feature point, and set a weight of each of the priority feature point, that has a value larger than the weight of the nonpriority feature point; and a registration unit configured to register the first image and the second image based on the priority feature points, the weights of the priority feature points, the nonpriority feature points, and the weights of the nonpriority feature points.

17 Claims, 14 Drawing Sheets

(56) References Cited

U.S. PATENT DOCUMENTS

| 8,958,612 B2 | 2/2015 | Miyasa et al. |
| 2011/0158487 A1* | 6/2011 | Ohyu .................... A61B 6/463 382/128 |
| 2016/0148380 A1 | 5/2016 | Otomaru et al. |

* cited by examiner

IMAGE PROCESSING APPARATUS, IMAGE PROCESSING METHOD, AND STORAGE MEDIUM FOR IMAGE PROCESSING BASED ON PRIORITY

BACKGROUND OF THE INVENTION

Field of the Invention

The present invention relates to an image processing apparatus, an image processing method, and a storage medium, and more particularly, to an image processing technique of processing a medical image captured by various kinds of medical image collection apparatuses (modalities) such as a magnetic resonance imaging apparatus (MRI), an X-ray computed tomography apparatus (X-ray CT), and an ultrasonic image diagnostic apparatus (US).

Description of the Related Art

In image diagnosis using medical images (3D tomographic images representing information in an object), a doctor makes a diagnosis while comparing images obtained by a plurality of imaging apparatuses (modalities) based on different positions, times, imaging parameters, and the like. However, since the orientation or shape of the object changes between the images, it is difficult to identify or compare a morbid portion. To solve this problem, registering a plurality of images has been attempted.

As a piece of general input information for registration of a plurality of images, feature points (corresponding points) having a one-to-one correspondence between images are used. Some corresponding points can automatically be identified by image processing. There also exist corresponding points that can hardly be automatically identified because of the influence of a modality difference, object deformation, or the like. In addition, corresponding points automatically identified by image processing are not always points that are correctly anatomically associated. For this reason, an operator such as a doctor sometimes manually performs the identification operation of corresponding points between images while viewing the images. The operator inputs a feature point on one medical image (to be referred to as a reference image hereinafter), and searches for and identifies a position corresponding to the feature point from the other medical image (to be referred to as a target image hereinafter) based on a similarity such as an image appearance. Feature points used for registration include a point that is identified by image processing and is not necessarily reliable and a point that is input by the operator and has reliable association.

Japanese Patent Laid-Open No. 2009-160045 discloses a registration technique using a corresponding point (extracted landmark) automatically identified by image processing and a corresponding point (user landmark) manually identified by an operator. In this technique, the user landmark is weighted more than the extracted landmark, and a plurality of images are registered by linear optimization.

However, both a landmark appropriate as a feature point for registration and a landmark that is not so coexist in the extracted landmarks. In the technique disclosed in Japanese Patent Laid-Open No. 2009-160045, registration is performed such that all extracted landmarks match in almost the same degree. Hence, even if positions that the operator wants to match preferentially match, appropriate registration is not always done in the remaining region.

The present invention has been made in consideration of the above-described problem, and provides an image processing technique capable of performing, in registration between a plurality of images, appropriate registration even in a region other than feature points that an operator wants to match preferentially.

SUMMARY OF THE INVENTION

According to one aspect of the present invention, there is provided an image processing apparatus comprising: a feature point obtaining unit configured to obtain, among feature points obtained from at least one of a first image and a second image, priority feature points that are registered preferentially and nonpriority feature points that have priority orders lower than those of the priority feature points to be registered; a weight setting unit configured to set a weight of each of the nonpriority feature points based on an evaluation value that evaluates a characteristic of the nonpriority feature point, and set a weight of each of the priority feature point, that has a value larger than the weight of the nonpriority feature point; and a registration unit configured to register the first image and the second image based on the priority feature points, the weights of the priority feature points, the nonpriority feature points, and the weights of the nonpriority feature points, wherein the feature point obtaining unit, the weight setting unit, and the registration unit are implemented using a processor and a program stored in a memory.

According to another aspect of the present invention, there is provided an image processing apparatus comprising: a feature point obtaining unit configured to obtain, among feature points obtained from at least one of a first image and a second image, priority feature points that are registered preferentially and nonpriority feature points that have priority orders lower than those of the priority feature points to be registered; a weight setting unit configured to set a weight of each of the nonpriority feature points based on an evaluation value that evaluates a characteristic of the nonpriority feature point, and set a weight of each of the priority feature points, that has a value larger than the weight of the nonpriority feature point; and a registration unit configured to register the first image and the second image based on the priority feature points, the weights of the priority feature points, the nonpriority feature points, and the weights of the nonpriority feature points.

According to still another aspect of the present invention, there is provided an image processing apparatus comprising: an obtaining unit configured to obtain feature points from at least one of a first image and a second image; a display control unit configured to cause a display unit to display a selection input portion for selecting whether to set each of the feature points as a priority feature point that is registered preferentially or a nonpriority feature point that has a priority order lower than that of the priority feature point to be registered; and a registration unit configured to register the first image and the second image using the feature points and information selected in the selection input portion.

According to yet another aspect of the present invention, there is provided an image processing method comprising: obtaining, among feature points obtained from at least one of a first image and a second image, priority feature points that are registered preferentially and nonpriority feature points that have priority orders lower than those of the priority feature points to be registered; setting a weight of each of the nonpriority feature points based on an evaluation value that evaluates a characteristic of the nonpriority feature point, and setting a weight of each of the priority feature points, that has a value larger than the weight of the nonpriority feature point; and registering the first image and the second image based on the priority feature points, the weights of the priority feature points, the nonpriority feature points, and the weights of the nonpriority feature points.

Further features of the present invention will become apparent from the following description of exemplary embodiments (with reference to the attached drawings).

DESCRIPTION OF THE EMBODIMENTS

Preferred embodiments of the present invention will now be described in detail with reference to the accompanying drawings. Note that the constituent elements described in the embodiments are merely examples. The technical scope of the present invention is determined by the scope of claims and is not limited by the following individual embodiments.

<First Embodiment: Nonpriority Feature Point is Weighted Based on Matching Degree to other Feature Points>

An image processing apparatus according to this embodiment performs registration between two images based on the information of feature points input by an operator. In the registration between the two images, the weight of a feature point (to be referred to as a priority feature point hereinafter) that the operator always wants to match is always set larger than the weight of a nonpriority feature point (to be described later) (the priority order of a feature point to be registered is set high). As for each feature point (to be referred to as a nonpriority feature point hereinafter) other than the priority feature points, registration is performed by setting a weight based on an evaluation value that evaluates the characteristic of the nonpriority feature point under a condition that the priority order of registration is lower than that for the priority feature points. Note that the feature points used for registration in this embodiment are corresponding points having a one-to-one correspondence between two images. That is, priority feature points and nonpriority feature points are feature points with a one-to-one correspondence between a first image and a second image.

In this embodiment, a weight for registration is added to each nonpriority feature point using a matching degree to other feature points as an evaluation value. The matching degree is information representing the degree of matching between a feature point of interest and deformation information between images defined by other feature points. Assuming one of nonpriority feature points is selected as a point of interest, if the matching degree of the point of interest to the feature points other than the point of interest is low, the weight of the nonpriority feature point (point of interest) is set small. On the other hand, if the matching degree of the point of interest to the feature points other than the point of interest is high, the weight of the nonpriority feature point (point of interest) is set large. Hence, even if a nonpriority feature point that is spatially inconsistent with whole feature points exists, it is possible to obtain an appropriate registration result in which a position desired by the operator reliably matches, and unnatural deformation is eliminated as a whole. An arrangement and processing according to this embodiment will be described below with reference to FIGS. 1 and 2.

Figure 1:
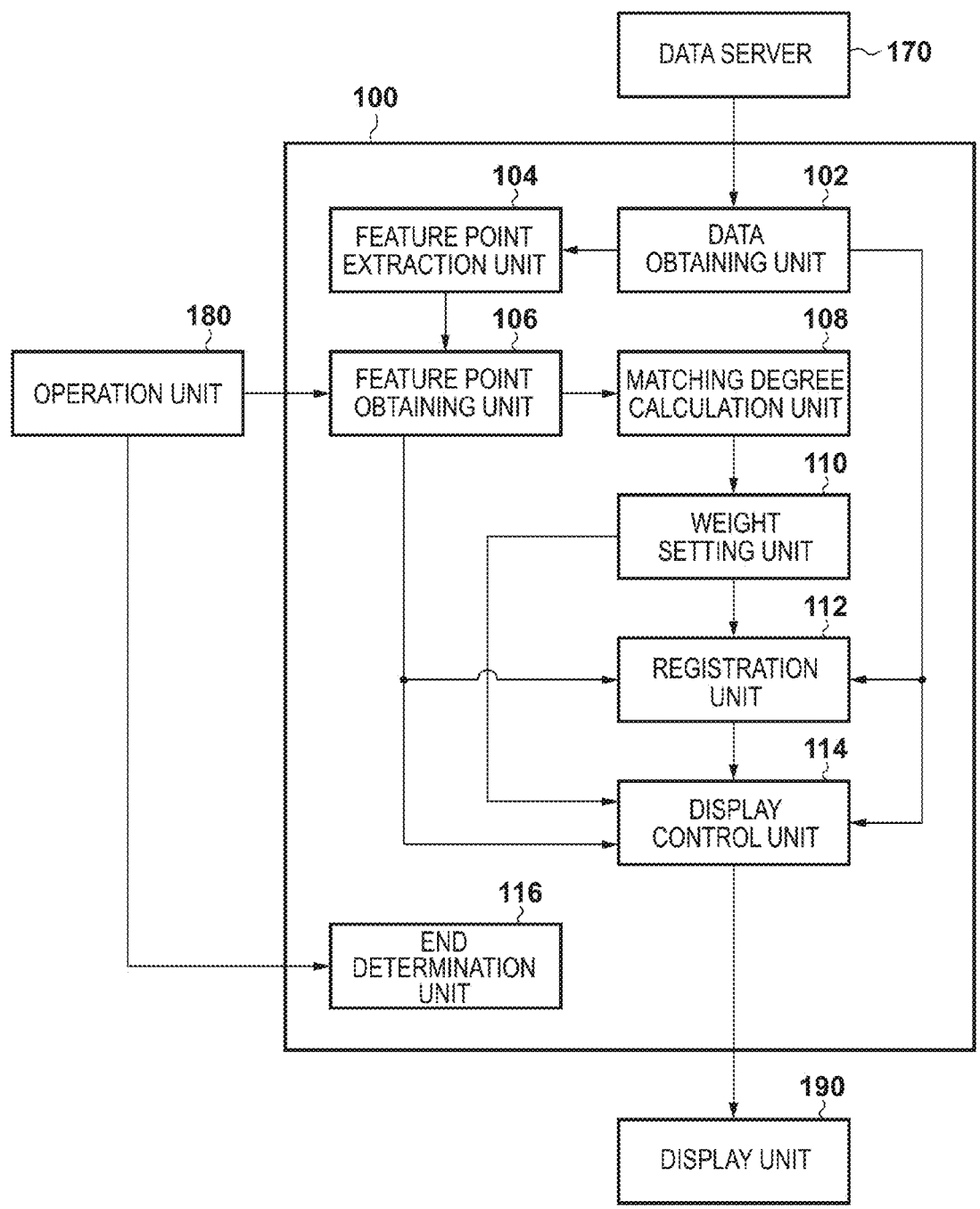
FIG. 1 is a block diagram showing an example of the arrangement of an image processing apparatus according to the first embodiment.

FIG. 1 is a block diagram showing an example of the arrangement of an image processing system including an image processing apparatus 100 according to this embodiment. The image processing system includes the image processing apparatus 100, a data server 170, an operation unit 180, and a display unit 190. As shown in FIG. 1, the image processing apparatus 100 according to this embodiment is connected to the data server 170, the operation unit 180, and the display unit 190.

A first image and a second image held by the data server 170 are 3D tomographic images (volume data) obtained by capturing an object in advance under different conditions (different modalities, imaging modes, dates/times, positions, and the like). The modality that captures a 3D tomographic image may be an MRI apparatus, an X-ray CT apparatus, a 3D ultrasonic imaging apparatus, a photoacoustic tomography apparatus, a PET/SPECT, an OCT apparatus, or the like. The first and second images may be, for example, images captured at the same time using different modalities or imaging modes. The images may be obtained by capturing the same patient in the same position using the same modality at different dates/times for follow-up. Note that each of the first image and the second image is formed as an aggregate of 2D tomographic images. The position and orientation of each 2D tomographic image are converted into a reference coordinate system (a coordinate system in a space based on an object as a reference) and held in the data server 170. The first image and the second image expressed by the reference coordinate system are input to the image processing apparatus 100 via a data obtaining unit 102. Here, the position is represented by three position components X, Y, and Z (3D position information) in the 3D space of the reference coordinate system. The orientation is the degree of rotation or tilt represented by three angle components Roll, Pitch, and Yaw (3D angle information) in the 3D space.

The operation unit 180 is, for example, a mouse or a keyboard. The operation unit 180 receives an operation by the operator, and inputs a set of feature points designated by the operator to the image processing apparatus 100 via a feature point obtaining unit 106.

The display unit 190 displays various kinds of information such as a display image generated by the image processing apparatus 100. A GUI used to obtain an operator's instruction is also arranged in the display unit 190. The display unit 190 can be formed using, for example, a liquid crystal monitor, an organic EL monitor, or the like.

(Arrangement of Image Processing Apparatus 100)

The image processing apparatus 100 is formed from constituent elements to be described below. The data obtaining unit 102 obtains the first image and the second image as 3D tomographic images to be input to the image processing apparatus 100. The data obtaining unit 102 outputs the first image and the second image to a feature point extraction unit 104, a registration unit 112, and a display control unit 114.

The feature point extraction unit 104 processes the first image and the second image, and extracts feature points in the first image and the second image. The feature point extraction unit 104 also obtains sets of feature points (sets of corresponding point coordinates) defined by associating the feature points between the images. A feature point extracted by the feature point extraction unit 104 will be referred to as an extracted feature point. A set of extracted feature points associated between the two images will be referred to as an extracted feature point pair. The feature point extraction unit 104 outputs the obtained extracted feature points to the feature point obtaining unit 106. The feature point obtaining unit 106 sets the feature points extracted by the feature point extraction unit 104 as nonpriority feature points.

The feature point obtaining unit 106 obtains feature points from at least one of the first image and the second image. That is, out of the feature points obtained from at least one of the first image and the second image, the feature point obtaining unit 106 obtains priority feature points to be preferentially registered and nonpriority feature points to be registered in a priority order lower than that of the priority feature points. Note that a set of priority feature points associated between the images will be referred to as a priority feature point pair. In addition, a set of nonpriority feature points associated between the images will be referred to as a nonpriority feature point pair.

The feature point obtaining unit 106 obtains a set of corresponding feature points (a set of corresponding point coordinates) between the first image and the second image in accordance with an operator's instruction via the operation unit 180. The feature point designated by the operator will be referred to as an input feature point, and a set of input feature points associated between the images will be referred to as an input feature point pair. Additionally, in accordance with an operator's instruction via the operation unit 180, the feature point obtaining unit 106 obtains identification information (label) that identifies an input feature point (input feature point pair) as a priority feature point or a nonpriority feature point. Identification information used to identify a priority feature point will be referred to as a priority label, and identification information used to identify a nonpriority feature point will be referred to as a nonpriority label. The feature point obtaining unit 106 determines an input corresponding point (input feature point pair) provided with a priority label as a priority corresponding point (priority feature point pair). The feature point obtaining unit 106 also determines an input corresponding point (input feature point pair) provided with a nonpriority label as a nonpriority corresponding point (nonpriority feature point pair). Furthermore, the feature point obtaining unit 106 determines an extracted feature point (extracted feature point pair) extracted by the feature point extraction unit 104 as a nonpriority feature point (nonpriority feature point pair). The feature point obtaining unit 106 outputs the determined priority feature points and nonpriority feature points to a matching degree calculation unit 108, the registration unit 112, and the display control unit 114.

As the evaluation value of each nonpriority feature point (nonpriority feature point pair), the matching degree calculation unit 108 calculates a matching degree to the remaining feature points (remaining feature point pairs) including priority feature points and the remaining nonpriority feature points. The matching degree calculation unit 108 calculates, as the evaluation value of each nonpriority feature point, a matching degree representing the degree of matching between the nonpriority feature point and deformation information between the first image and the second image defined by the remaining feature points including the priority feature points and other nonpriority feature points. The matching degree calculation unit 108 can calculate the matching degree based on the information of a displacement field generated based on the positions of the priority feature points and the nonpriority feature points. For example, the matching degree calculation unit 108 calculates, for each nonpriority feature point, the matching degree to the remaining feature points based on the information of two displacement fields (to be described later) generated based on the positions of corresponding feature points (the positions of priority feature points and nonpriority feature points). The displacement field represents, for each coordinate of the first image, which is the coordinate of the second image to which the coordinate of the first image corresponds (displaces), and is expressed as volume data or a function that describes it. The matching degree calculation unit 108 outputs the calculated matching degree to a weight setting unit 110.

The weight setting unit 110 sets the weight of a nonpriority feature point based on the evaluation value that evaluates the characteristic of the nonpriority feature point, and also sets the weight of a priority feature point, which has a value larger than the weight of the nonpriority feature point. The weight setting unit 110 also sets weights for registration for all feature point pairs (priority feature point pairs and nonpriority feature point pairs). That is, the weight setting unit 110 sets the weight of a nonpriority feature point pair based on the evaluation value of the nonpriority feature point pair obtained from the matching degree calculation unit 108. The weight setting unit 110 also sets a value larger than the weight of the nonpriority feature point pair as the weight of a priority feature point pair. The weight setting unit 110 outputs the set weights of the feature point pairs to the registration unit 112.

The registration unit 112 performs registration between the first image and the second image based on the priority feature points and the weights of the priority feature points and the nonpriority feature point and the weights of the nonpriority feature points. The registration unit 112 also performs registration between the first image and the second image based on the priority feature point pairs and the weights of the priority feature point pairs and the nonpriority feature point pairs and the weights of the nonpriority feature point pairs. The registration unit 112 performs deformable registration between the first image and the second image based on the obtained feature point pairs (the priority feature point pairs and the nonpriority feature point pairs) and their weights, and generates a deformed image by, for example, deforming the first image such that its shape matches the second image. Note that the deformed image need not always based on the first image, and the second image may be deformed such that its shape matches the first image. The registration unit 112 outputs the generated deformed image to the display control unit 114.

The display control unit 114 displays the registration result of the registration unit 112 on the display unit 190. Here, the display control unit 114 performs display control to display information such as a cross-sectional image of the first image, a cross-sectional image of the second image, the feature points, and the deformed image on the display unit 190. An end determination unit 116 determines, in accordance with an operator's instruction via the operation unit 180, whether to end the registration.

Figure 2:
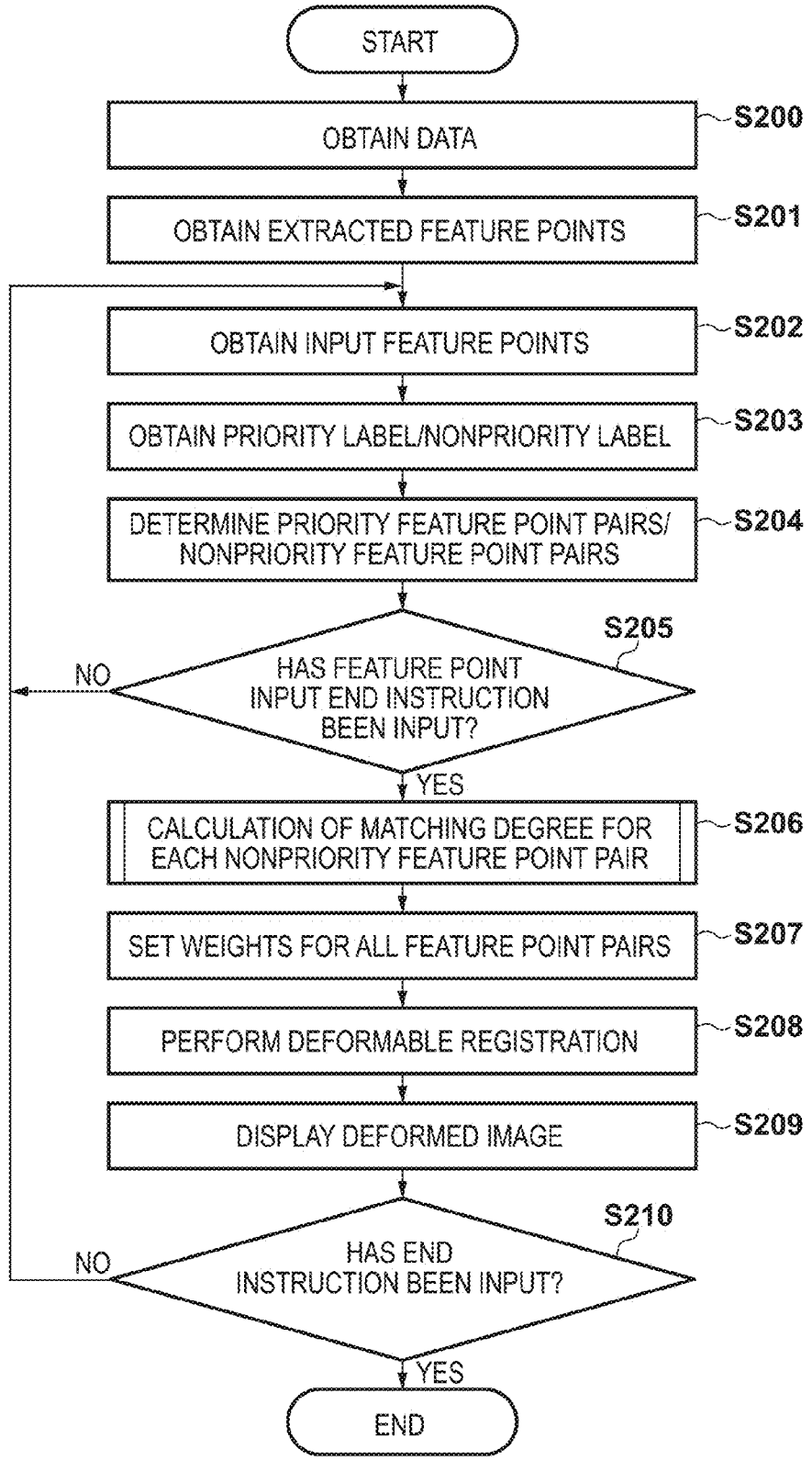
FIG. 2 is a flowchart showing a processing procedure performed by the image processing apparatus according to the first embodiment.

Processing performed by the image processing apparatus 100 will be described next. FIG. 2 is a flowchart showing an entire processing procedure performed by the image processing apparatus 100.

(Obtaining of Data)

In step S200, the data obtaining unit 102 of the image processing apparatus 100 obtains a first image and a second image from the data server 170. The data obtaining unit 102 outputs the obtained images to the feature point extraction unit 104 and the display control unit 114.

(Obtaining of Extracted Feature Points)

In step S201, the feature point extraction unit 104 of the image processing apparatus 100 processes the first image and the second image, thereby extracting feature points (extracted feature points) from each image. This processing can be done using, for example, known image feature point extraction processing such as interest operator.

Next, the feature point extraction unit 104 performs processing of generating sets of corresponding extracted feature points (extracted feature point pairs) between the images by associating the extracted feature points extracted from the first image and the second image in a one-to-one correspondence. The feature point extraction unit 104 outputs the information of the extracted feature point pairs to the feature point obtaining unit 106. The feature point obtaining unit 106 determines all the extracted feature point pairs as nonpriority feature point pairs. Note that an expression "extracted feature point pair" is used here independently of whether a single or a plurality of extracted feature point pairs exist. The feature point extraction unit 104 sets a region of interest near each extracted feature point of each image, and associates feature points having a high image similarity in the region of interest between the images, thereby generating an extracted feature point pair. The feature point extraction unit 104 can use a known method, for example, Sum of Squared Difference (SSD), Sum of Absolute Difference (SAD), or cross-correlation function as processing of calculating the image similarity. Note that the method of associating the extracted feature points between the images is not limited to this, and any known technique, for example, Random Sample Consensus (RANSAC) is usable.

(Obtaining of Input Corresponding Points)

In step S202, the feature point obtaining unit 106 of the image processing apparatus 100 obtains sets of input feature points (input feature point pairs) that are input in a one-to-one correspondence between the first image and the second image in accordance with an operator's instruction via the operation unit 180. Note that an expression "input feature point pair" is used here independently of whether a single or a plurality of input feature point pairs exist. Detailed processing is performed in the following way.

The display control unit 114 displays, on the display unit 190, a cross-sectional image of the first image and a cross-sectional image of the second image obtained from the data obtaining unit 102. Next, the operator operates an input unit (for example, a mouse or a keyboard) included in the operation unit 180, thereby switching the cross-sectional image to be displayed, selecting a cross-sectional image of interest of the first image and a cross-sectional image of interest of the second image, and displaying them on the display unit 190. For example, the display control unit 114 displays the cross-sectional image of the first image and the cross-sectional image of the second image side by side on the display unit 190. On each cross-sectional image displayed on the display unit 190, the operator inputs the position of a feature point by operation input (for example, mouse click) on the input unit. The operation input of the operator is input to the feature point obtaining unit 106 via the operation unit 180. At this time, the operation unit 180 functions as a designation unit that designates a feature point on each image displayed on the display unit 190. The designation unit designates a set of corresponding feature points (designated by the operator as corresponding points) as an input feature point pair on the cross-sectional image of the first image and the cross-sectional image of the second image. The feature point obtaining unit 106 converts the positions of feature points input (designated) on each cross-sectional image into 3D position information (3D coordinates) using the position and orientation of the cross-sectional image in the image. The feature point obtaining unit 106 performs this processing for the corresponding feature points between the first image and the second image, and obtains them as input feature point pairs. The display control unit 114 displays the cross-sectional image of the first image and the cross-sectional image of the second image side by side on the display unit as a registration result. The designation unit designates sets of corresponding feature points as input feature points on the cross-sectional image of the first image and the cross-sectional image of the second image. The display control unit 114 displays, on the display unit, a selection input portion used to select whether to set an input feature point as a priority feature point or a nonpriority feature point. That is, the display control unit 114 displays, on the display unit, a selection input portion used to select whether to set each input feature point as a priority feature point to be preferentially registered or a nonpriority feature point to be registered in a priority order lower than that of the priority feature point. Here, the registration unit 112 can register the first image and the second image using the feature points and the information selected on the selection input portion.

Figure 3:
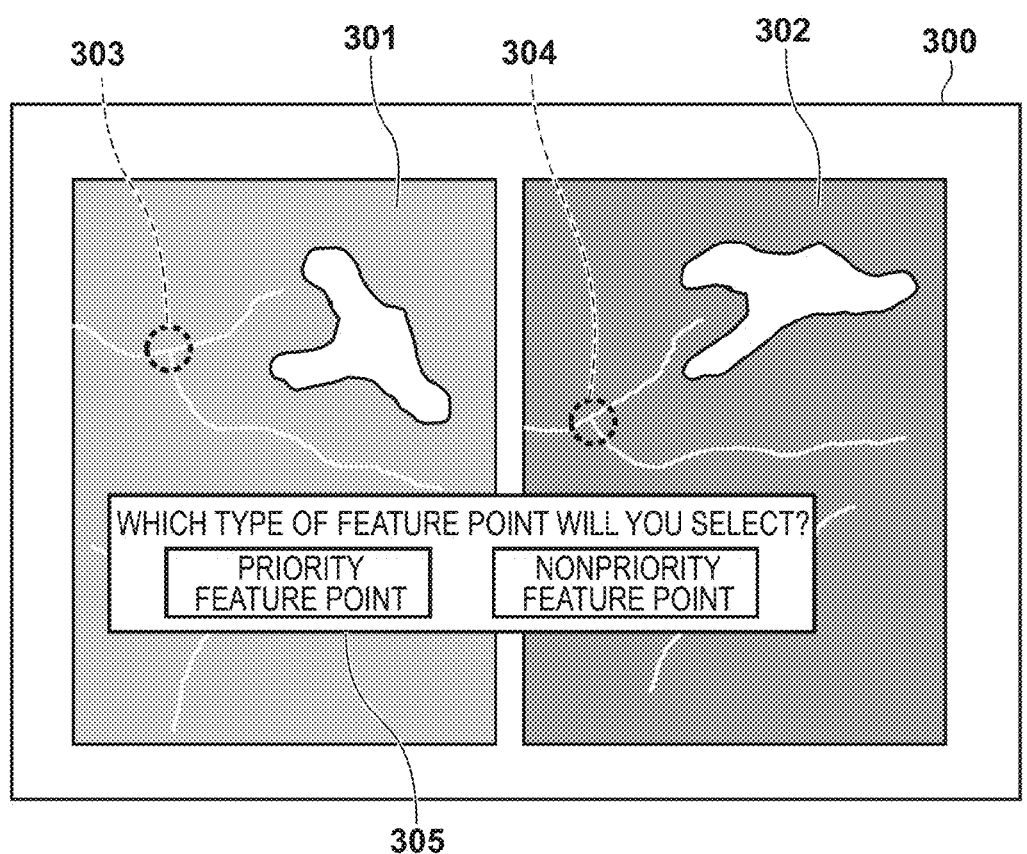
FIG. 3 is a view showing a display screen used by an operator to input feature points.

FIG. 3 is a view showing a display screen used by the operator to input an input feature point pair. The display control unit 114 displays a first cross-sectional image 301 (a cross-sectional image of the first image) and a second cross-sectional image 302 (a cross-sectional image of the second image) side by side on a display screen 300 of the display unit 190. An input feature point 303 of first cross-sectional image 301 input by the operator and a corresponding input feature point 304 of the second cross-sectional image 302 are displayed on the display screen of the display unit 190. The input feature points designated on the images are provided with the same identification number (ID) and associated as an input feature point pair.

(Obtaining of Priority Label/Nonpriority Label)

In step S203, the feature point obtaining unit 106 of the image processing apparatus 100 obtains, in accordance with an operator's instruction, a priority label or a nonpriority label to be set for each input feature point (input feature point pair) obtained in step S202. After obtaining the input feature points in step S202, the display control unit 114 displays, on the display screen 300, a selection input portion 305 (GUI) used to select the type of a feature point (a priority feature point or a nonpriority feature point). That is, the display control unit 114 displays, on the display screen 300, the selection input portion 305 used to select whether to set an input feature point as a priority feature point or a nonpriority feature point. The feature point obtaining unit 106 sets priority feature points and nonpriority feature points in accordance with selection on the selection input portion 305.

The feature point obtaining unit 106 obtains, in accordance with an operator's instruction via the operation unit 180, identification information (label) that identifies whether to set an input feature point as a priority feature point or a nonpriority feature point. When "priority feature point" is selected from the selection input portion 305 (GUI), the feature point obtaining unit 106 obtains a priority label and sets the input feature point as a priority feature point. When the priority label is set for one input feature point of an input feature point pair, the feature point obtaining unit 106 sets the same label (priority label) for the other input feature point of the input feature point pair. That is, the priority label is set for the input feature point pair.

When "nonpriority feature point" is selected from the selection input portion 305 (GUI), the feature point obtaining unit 106 obtains a nonpriority label and sets the input feature point as a nonpriority feature point. When the nonpriority label is set for one input feature point of an input feature point pair, the feature point obtaining unit 106 sets the same nonpriority label for the other input feature point of the input feature point pair. That is, the nonpriority label is set for the input feature point pair.

Display of the selection input portion 305 (GUI) that causes the operator to select the priority label or the nonpriority label is not limited to the display example shown in FIG. 3, and any method that enables selection of the priority label/nonpriority label is usable. For example, a radio button used to select the priority label/nonpriority label may be arranged in the region of the display screen 300, and the operator may be caused to press the radio button.

An input feature point to be provided with the "priority label" is, for example, a feature point identifiable between images such as a branch portion of a blood vessel whose 3D position can be specified by the operator. An example of an input feature point to be provided with the "nonpriority label" is a feature point that is difficult to attain a clear 3D position correspondence and leads to ambiguity in operator's determination. Note that the present invention is not limited to this example, and the operator can arbitrarily select the priority label/nonpriority label on the screen.

(Determination of Priority Feature Point Pairs/Nonpriority Feature Point Pairs)

In step S204, the feature point obtaining unit 106 of the image processing apparatus 100 determines priority feature point pairs and nonpriority feature point pairs based on the information of the priority label or nonpriority label set for the input feature points (input feature point pairs) and the information of extracted feature point pairs.

More specifically, out of all the input feature point pairs, the feature point obtaining unit 106 determines each input feature point pair for which the priority label is set as a priority feature point pair. In addition, the feature point obtaining unit 106 determines each input feature point pair for which the nonpriority label is set as a nonpriority feature point pair.

Note that expressions "priority feature point pair" and "nonpriority feature point pair" are used here independently of whether a single or a plurality of priority feature point pairs or nonpriority feature point pairs exist.

On the cross-sectional image of the first image and the cross-sectional image of the second image, the display control unit 114 displays the priority feature points and the nonpriority feature points in different display forms on the display unit 190. For example, the display control unit 114 can overlay a priority feature point and a nonpriority feature point, which are located in the neighborhood on a displayed cross-sectional image, on the cross-sectional image in different display modes.

Figure 4:
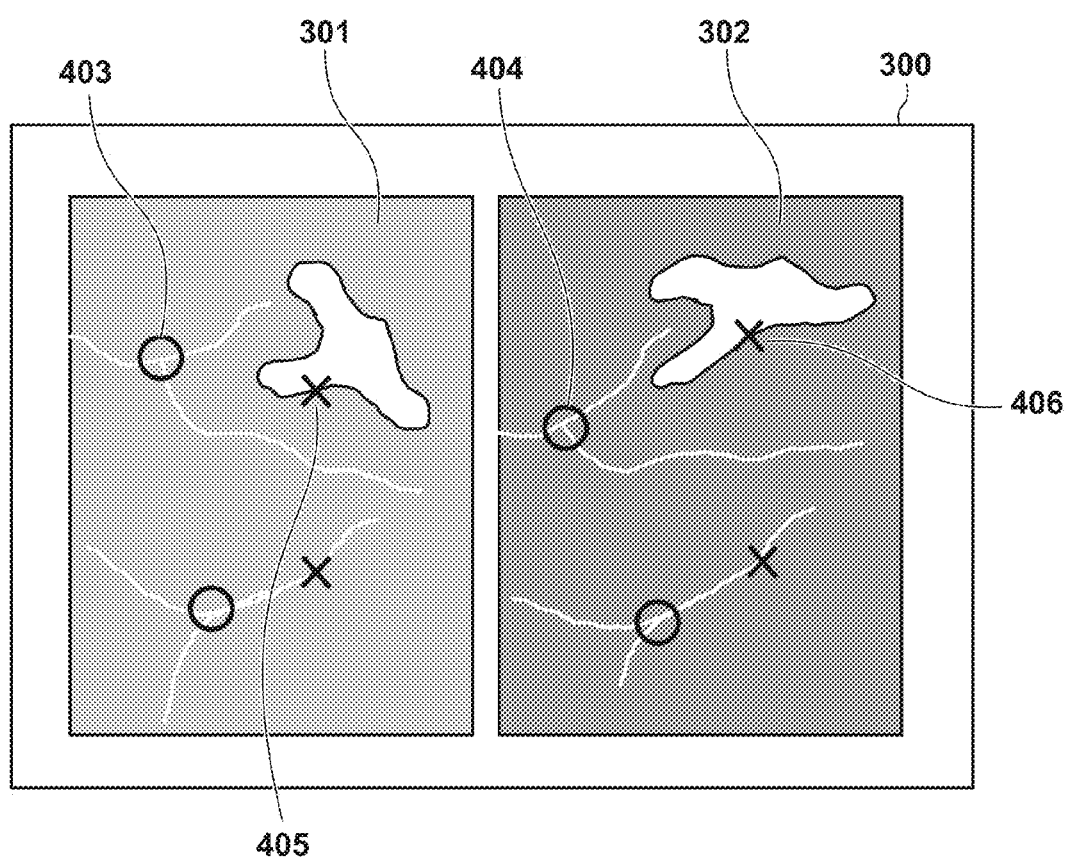
FIG. 4 is a view showing a display screen that displays priority feature points and nonpriority feature points.

FIG. 4 is a view showing the display screen 300 that displays priority feature points and nonpriority feature points. Referring to FIG. 4, a priority feature point 403 is displayed on the first cross-sectional image 301, and a priority feature point 404 corresponding to it is displayed on the second cross-sectional image 302 by ○. In addition, a nonpriority feature point 405 is displayed on the first cross-sectional image 301, and a nonpriority feature point 406 corresponding to it is displayed on the second cross-sectional image 302 by x. As shown in FIG. 4, the first cross-sectional image 301 and the second cross-sectional image 302 are displayed side by side on one display screen 300, and in this state, the priority feature points and the nonpriority feature points are overlaid on the cross-sectional images. This allows the operator to visually confirm the positional relationship of the feature points between the plurality of images.

(Determination of End of Feature Point Input)

In step S205, the feature point obtaining unit 106 of the image processing apparatus 100 determines whether a feature point input end instruction (an operation input of the operator) is input via the operation unit 180. If a feature point input end instruction is not input (NO in step S205), the feature point obtaining unit 106 returns the process to step S202 to repeat the same processing as described above. On the other hand, upon determining in step S205 that a feature point input end instruction is input (YES in step S205), the feature point obtaining unit 106 performs the following processing. That is, the feature point obtaining unit 106 outputs the priority feature point pairs and the nonpriority feature point pairs determined by the processing from step S202 to this step to the display control unit 114, the matching degree calculation unit 108, and the registration unit 112, and advances the process to step S206.

(Calculation of Matching Degree of Each Nonpriority Feature Point Pair)

In step S206, the matching degree calculation unit 108 of the image processing apparatus 100 calculates, for each nonpriority feature point pair, a matching degree to the remaining feature point pairs. That is, when one nonpriority feature point pair is selected as a point pair of interest, the matching degree calculation unit 108 calculates the matching degree between the point pair of interest and the remaining feature point pairs (feature point pairs other than the point pair of interest, including the priority feature point pairs and the remaining nonpriority feature point pairs). The matching degree calculation unit 108 transmits the calculated matching degree to the weight setting unit 110.

Figure 5:
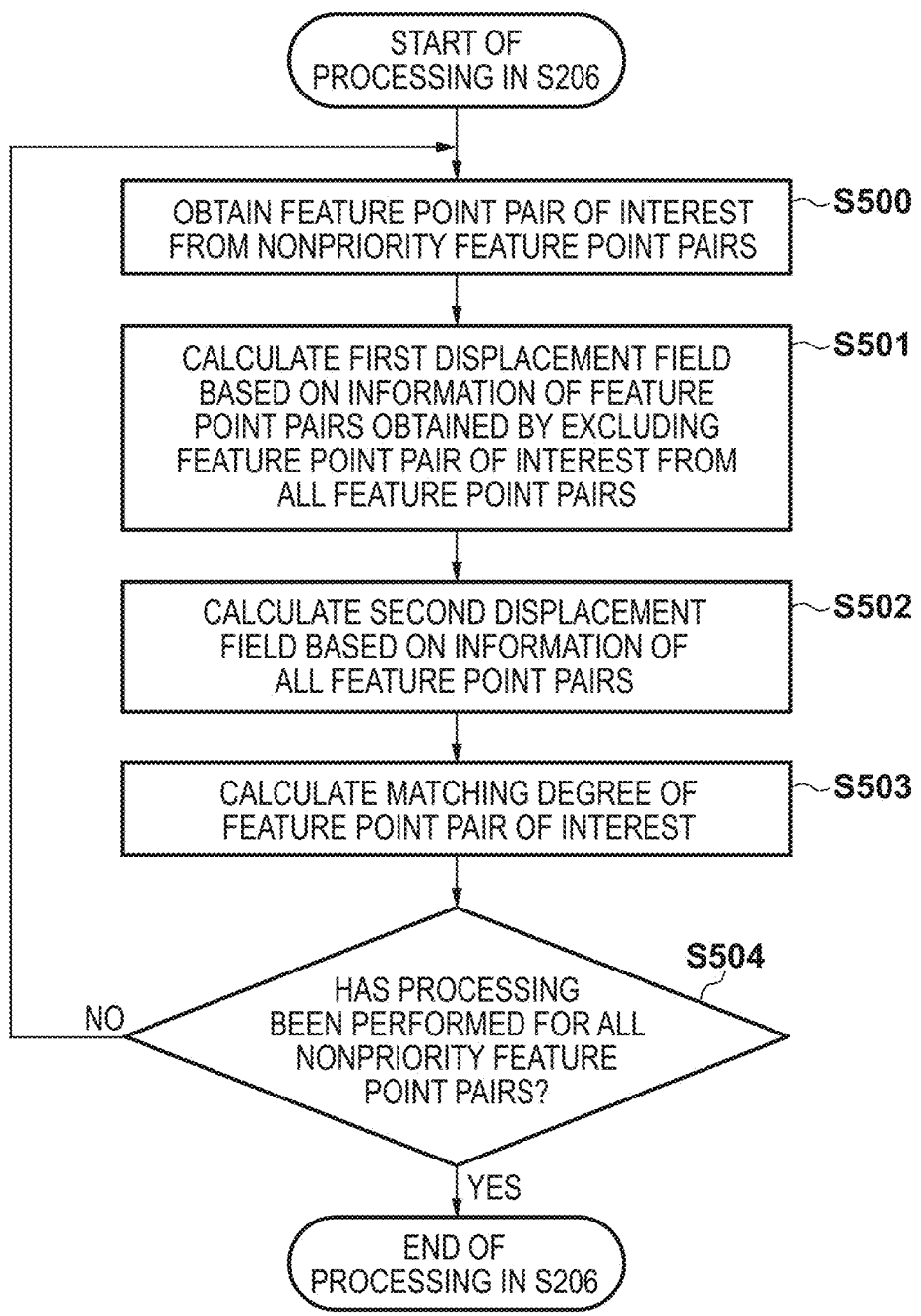
FIG. 5 is a flowchart showing a processing procedure of calculating the matching degree of each nonpriority feature point.

Details of processing of calculating the matching degree of each nonpriority feature point pair in step S206 will be described below with reference to the flowchart of FIG. 5.

(Step S500)

In step S500, the matching degree calculation unit 108 obtains one feature point pair of interest (to be referred to as a feature point pair of interest) from the nonpriority feature point pairs. A nonpriority feature point pair that has already been obtained as a feature point pair of interest is excluded from the obtaining targets.

(Step S501)

In step S501, the matching degree calculation unit 108 calculates a first displacement field based on the positions of all feature point pairs (to be referred to as remaining feature point pairs) except the feature point pair of interest. That is, the matching degree calculation unit 108 obtains the displacement field between the first image and the second image based on the positions of the priority feature point pairs and the nonpriority feature point pairs other than the nonpriority feature point pair of interest. Here, all feature point pairs mean feature point pairs including all priority feature point pairs and nonpriority feature point pairs.

More specifically, the matching degree calculation unit 108 calculates the displacement field (first displacement field) between the first image and the second image based on the positions (3D position information) of the remaining feature point pairs and based on the positions of the priority feature points and the nonpriority feature points except the nonpriority feature point of interest. This displacement field (first displacement field) is a displacement field obtained by displacing the positions of the remaining feature points on the first image, which form the remaining feature point pairs such that the feature points move as close as possible to the remaining corresponding feature points on the second image, which form the remaining feature point pairs and spatially smoothly interpolating the displacement. Note that as the displacement field calculation method, the matching degree calculation unit 108 can use a known method, for example, free-form deformation (FFD) that represents displacement by interpolation of a B-spline function. In this embodiment, a displacement field represented by FFD is defined as a first displacement field. The first displacement field is a displacement field on which the positions (3D position information) of feature point pairs (remaining feature point pairs) other than the feature point pair of interest are reflected. Note that the processing of obtaining the first displacement field need not always use all remaining feature point pairs as long as it is displacement field calculation processing meeting a condition that the feature point pair of interest is not used.

(Step S502)

In step S502, the matching degree calculation unit 108 calculates a displacement field (second displacement field) between the first image and the second image based on the positions of all feature point pairs and based on the positions of the priority feature points and the nonpriority feature points including the nonpriority feature point of interest. That is, the matching degree calculation unit 108 obtains the second displacement field based on the positions of the priority feature point pairs and all nonpriority feature point pairs including the nonpriority feature point pair of interest. The detailed method of displacement field calculation is the same as in step S501 except the feature point pairs that are used, and a description thereof will be omitted. The second displacement field is a displacement field on which the positions (3D position information) of all feature point pairs including the feature point pair of interest are reflected. Note that the processing of obtaining the second displacement field need not always use all the feature point pairs as long as it is displacement field calculation processing meeting a condition that the displacement field is obtained based on information including not only the remaining feature point pairs (the remaining feature point pairs are not necessarily all the remaining feature point pairs) used by the processing in step S501 but also the feature point pair of interest.

(Step S503)

In step S503, the matching degree calculation unit 108 calculates the matching degree of the feature point pair of interest to the remaining feature point pairs using the first displacement field calculated in step S501 and the second displacement field calculated in step S502. More specifically, the matching degree here is obtained by quantifying a local distortion in the displacement field generated when the feature point pair of interest is added to the remaining feature point pairs. The matching degree calculation unit 108 compares the first displacement field and the second displacement field, thereby obtaining the influence of the position (3D position information) of the feature point pair of interest on displacement field calculation as the matching degree. For example, for the nonpriority feature point of interest, the matching degree calculation unit 108 calculates the matching degree of the nonpriority feature point of interest based on the difference between the first displacement field and the second displacement field. In addition, for the nonpriority feature point pair of interest, the matching degree calculation unit 108 calculates the matching degree of the nonpriority feature point pair of interest based on the difference between the first displacement field and the second displacement field. The matching degree calculation unit 108 evaluates that the matching degree is low if the direction of the displacement field at the position of a feature point of the feature point pair of interest largely changes between a case in which the feature point pair of interest is not added and a case in which the feature point pair of interest is added. Conversely, the matching degree calculation unit 108 evaluates that the matching degree is high if the change in the direction of the displacement field is small.

In this embodiment, the matching degree is formulated based on the difference between the displacement fields at the position of the feature point of interest. The first displacement field is represented by $T_1$ and the second displacement field is represented by $T_2$. In this case, $T_1$ and $T_2$ are functions each having a 3D value defined in the space represented by the coordinate system of the first image. Each function indicates conversion from the coordinate system of the first image into that of the second image, and is a function of returning a displacement (3D displacement vector) to a corresponding position in the coordinate system of the second image by using an arbitrary position in the coordinate system of the first image as an argument.

With respect to a position p of the feature point of interest of the feature point pair of interest on the first image, by representing the displacement vectors of the first displacement field T1 and the second displacement field T2 by $t_{p,1}$ and $t_{p,2}$, respectively, the matching degree calculation unit 108 can calculate a matching degree M by:

$$M = t_{p,1} \cdot t_{p,2} / (|t_{p,1}| \cdot |t_{p,2}|) \tag{1}$$

This calculation processing is to calculate the cosine of an angle formed by the two displacement vectors $t_{p,1}$ and $t_{p,2}$. If the angle formed by the two displacement vectors is small, the value of the matching degree M becomes high, and the matching degree calculation unit 108 evaluates that the matching degree M is high. On the other hand, if the angle formed by the two displacement vectors is large, the value of the matching degree M becomes low, and the matching degree calculation unit 108 evaluates that the matching degree M is low. Since the value of M is the cosine of the angle formed by the displacement vectors according to equation (1), the matching degree calculation unit 108 calculates the matching degree within a range of $-1 \leq M \leq 1$. That is, based on the angle difference between the displacement vectors of the two displacement fields at the position of the feature point of interest, the matching degree calculation unit 108 calculates the matching degree of the feature point of interest.

Note that the matching degree calculation unit 108 can calculate the matching degree by another method based on the difference between the displacement fields $T_1$ and $T_2$. For example, the matching degree calculation unit 108 can obtain the determinants (Jacobians) of the Jacobian matrices of $T_1$ and $T_2$ for the position p of the feature point of interest, and calculate the matching degree based on the difference between the determinants (Jacobians). In this case, the matching degree calculation unit 108 can determine that the matching degree is low if the volume of a local region changes. The matching degree calculation unit 108 can obtain the value of equation (1) or a Jacobian value at each point near the position p of the feature point of interest, and calculate the integrated value of the obtained values as a matching degree. Note that each of the above-described methods is merely an embodiment of the present invention. The present invention is not limited to them, and any method may be used to calculate a matching degree as long as the quantitative value of the difference between two displacement fields is calculated by inputting the two displacement fields.

(S504)

In step S504, the matching degree calculation unit 108 determines whether the matching degree calculation processing has been performed for all the nonpriority feature point pairs. If the matching degree calculation processing has been performed for all the nonpriority feature point pairs (YES in step S504), the processing in step S206 ends. On the other hand, if a nonpriority feature point pair for which no matching degree calculation processing has been performed remains (NO in step S504), the process returns to step S500, and the matching degree calculation unit 108 performs the same processing for the nonpriority feature point pair for which no matching degree calculation processing has been performed. The above processing can calculate, for each nonpriority feature point pair, a matching degree to the remaining feature point pairs. When the matching degree calculation processing ends, the process advances to step S207 of FIG. 2.

(Setting of Weights of Feature Point Pairs)

In step S207, the weight setting unit 110 sets weights for registration for all the feature point pairs (priority feature point pairs and nonpriority feature point pairs). The weight setting unit 110 transmits the values of the set weights to the registration unit 112 and the display control unit 114.

The weight setting unit 110 sets the weights of the priority feature point pairs to values so that a constraint to match the priority feature point pairs in registration of the first and second images sufficiently works. In this example, letting $P_{p,i}$ ($0 \leq i \leq N_p$ where $N_p$ represents the number of priority feature point pairs) be each priority feature point pair, a weight corresponding to the priority feature point pair $P_{p,i}$ is represented by $w_{p,i}$. The weight setting unit 110 sets the weights of all the priority feature point pairs $P_{p,i}$ to $w_{p,i}=1.0$.

The weight setting unit 110 sets the weight of each nonpriority feature point pair based on the matching degree of each nonpriority feature point pair obtained in step S206. Letting $P_{n,j}$ ($0 \leq j \leq N_n$ where $N_n$ represents the number of nonpriority feature point pairs) be each nonpriority feature point pair, a weight corresponding to the nonpriority feature point pair $P_{n,j}$ is represented by $W_{n,j}$. A matching degree corresponding to the nonpriority feature point pair $P_{n,j}$ is represented by $M_j$. Although a weight for registration is generally 0 or more, the value of the matching degree $M_j$ falls within the range of $-1 \leq M_j \leq 1$, and thus the weight setting unit 110 sets the weight $w_{n,j}$ by:

$$w_{n,j} = 0.5 \cdot M_j + 0.5 \quad (2)$$

This can set the weight $W_{n,j}$ within the range of $0 \leq w_{n,j} \leq 1$ ($=w_{p,i}$) in accordance with the magnitude of the matching degree $M_j$.

The display control unit 114 overlays and displays, on the cross-sectional images being displayed, the information of the weights $w_{p,i}$ of the priority feature point pairs and the weights $w_{n,j}$ of the nonpriority feature point pairs, which has been obtained from the weight setting unit 110.

Figure 6:
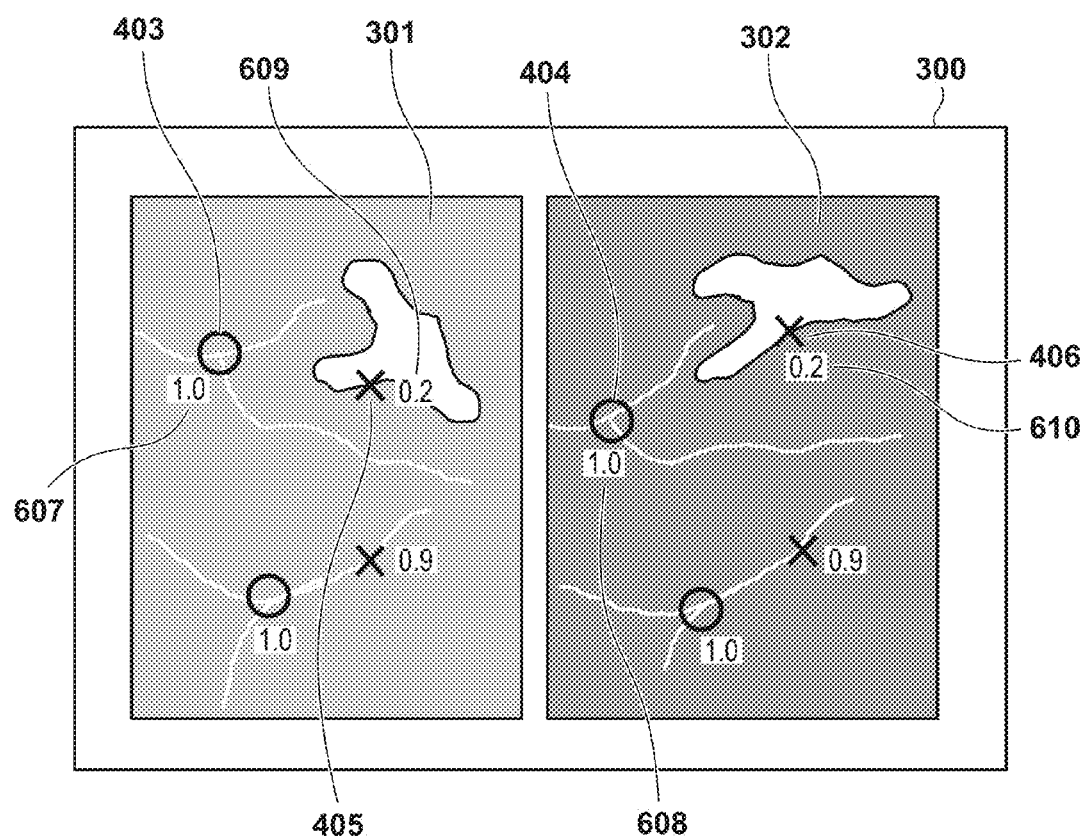
FIG. 6 is a view showing a screen in which weight information is overlaid on cross-sectional images.

FIG. 6 is a view exemplarily showing the display screen 300 on which the information of the weights for registration is overlaid and displayed on the cross-sectional images. Referring to FIG. 6, as an example of the weight $w_{p,i}$ of each priority feature point pair, weights 607 and 608 (value=1.0) corresponding to the priority feature points 403 and 404 (priority feature point pair) are displayed on the first cross-sectional image 301 (the cross-sectional image of the first image) and the second cross-sectional image 302 (the cross-sectional image of the second image), respectively. As an example of the weight $w_{n,j}$ of each nonpriority feature point pair, weights 609 and 610 (value=0.2) corresponding to the nonpriority feature points 405 and 406 are displayed on the first cross-sectional image 301 and the second cross-sectional image 302, respectively. This allows the operator to grasp, before registration, a specific weight for registration to be added to a specific feature point pair.

(Deformable Registration)

In step S208, the registration unit 112 of the image processing apparatus 100 performs deformable registration of the first and second images. That is, the registration unit 112 estimates a displacement field from the first image to the second image using all the feature point pairs (priority feature point pairs and nonpriority feature point pairs) and the values of the weights, which have been obtained up to step S207. Based on the estimated displacement field, the registration unit 112 generates a deformed image by deforming the first image such that its shape matches the second image. At this time, based on the value of the weight $w_{p,i}$ corresponding to the priority feature point pair and the value of the weight $w_{n,j}$ corresponding to the nonpriority feature point pair, the registration unit 112 estimates the displacement field between the first and second images so that the feature points of each of the priority feature point pair $P_{p,i}$ and nonpriority feature point pair $P_{n,j}$ match between the images.

In this embodiment, in the registration processing, the registration unit 112 calculates a displacement field that minimizes, by an optimization method, an evaluation function E of evaluating appropriateness of deformable registration. The registration unit 112 can use a general method such as a steepest descent method or Newton's method as an optimization method. This embodiment is not limited to this, and the registration unit 112 can use other optimization methods.

The evaluation function E is formed by a term $\theta(x_1', x_2)$ representing a constraint to decrease misregistration of a feature point pair as much as possible between the two images and a term $\Phi(I_M', I_F)$ representing a constraint to decrease non-similarity between the two images as much as possible, and given by:

$$E = w_\theta \cdot \theta(x_1', x_2) + w_\Phi \cdot \Phi(I_M', I_F) \quad (3)$$

Letting $x_1$ be a set of all the feature points (priority feature points+nonpriority feature points) on the first image, $x_1'$ represents a set of the coordinates of all the feature points on the first image deformed during optimization of the evaluation function E.

Furthermore, $x_2$ represents a set of the coordinates of all the feature points on the second image, which corresponds to $x_1'$. Letting $I_M$ be the first image, $I_M'$ represents the first image deformed during optimization and $I_F$ represents the second image. Note that the first image $I_M$ and the second image $I_F$ are obtained from the data obtaining unit 102.

Note that $w_\theta$ and $w_\Phi$ represent weighting coefficients for balancing the terms $\theta$ and $\Phi$. In this embodiment, $w_\theta=1.0$ and $w_\Phi=1.0$ are set as exemplary settings. The term $\theta$ is given by:

$$\theta(x_1, x_2) = \sum_{i=1}^{N_p} w_{p,i} \|x_{1,i}' - x_{2,i}\| + \sum_{j=1}^{N_n} w_{n,j} \|x_{1,j}' - x_{2,j}\| \quad (4)$$

Letting $x_{1,i}$ and $x_{1,j}$ respectively be the coordinates of the ith priority feature point and jth nonpriority feature point, that are included in all the feature points $x_1$ on the first image, $x_{1,i}'$ and $x_{1,j}'$ respectively represent coordinates obtained by displacing the coordinates $x_{1,i}$ and $x_{1,j}$ from the first image to the second image in accordance with a displacement field during optimization. Furthermore, $x_{2,i}$ and $x_{2,j}$ respectively represent the coordinates of the ith priority feature point and jth nonpriority feature point, that are included in all the feature points $x_2$ on the second image. According to equation (4), as the value of the weight $w_{p,i}$ or $w_{n,j}$ is larger, the influence of the residual of the corresponding feature point pair on the term $\theta$ as a whole becomes larger. Therefore, to decrease the term $\theta$ as a whole in the final registration result of registration processing, the registration unit 112 performs registration processing so that the residual becomes smaller for a feature point pair having a larger influence. Consequently, since all the priority feature point pairs each having a large influence have large weights, they can be sufficiently made to match between the images. On the other hand, the feature points of the nonpriority feature point pairs having small weights may not sufficiently match between the images.

Note that the term $\Phi(I_M', I_F)$ representing the constraint to decrease the image non-similarity between the two images as much as possible is a constraint using general image similarity and a detailed description thereof will be omitted. The registration unit 112 represents a displacement field by a deformation model using a known method such as free-form deformation (FFD) used in step S501.

If the residual of the priority feature point pair is not small enough as compared with a threshold as a reference in the registration result, the registration unit 112 performs registration processing of making the priority feature point pair match by locally deforming only a region near the priority feature point pair (for example, the priority feature point in the first image). For example, the registration unit 112 can use a registration method using a radial basis function (RBF) as a general method for making the input feature points completely match each other. By adopting, as a basis function in RBF, a function of largely attenuating a value as a distance from the origin is longer, such as a Gaussian function, the registration unit 112 can perform registration so that the range influenced by deformation is limited to only a region near the priority feature point pair. Note that a case in which the registration unit 112 uses the above RBF for local registration has been exemplified. However, a method to be adopted is not limited to the RBF as long as deformation influences a local region and feature points are reliably made to match each other.

Lastly, the registration unit 112 generates a deformed image by deforming the first image such that its shape matches the second image by applying the generated displacement field to the first image. The registration unit 112 also generates a deformed image by deforming the second image such that its shape matches the first image, as needed. The registration unit 112 saves the estimated displacement field and the generated deformed image in a storage medium (not shown). The registration unit 112 also outputs the generated deformed image to the display control unit 114. The above processing (estimation of the displacement field and generation of the deformed image) executes deformable registration of the first and second images.

(Display of Deformed Image)

Figure 7:
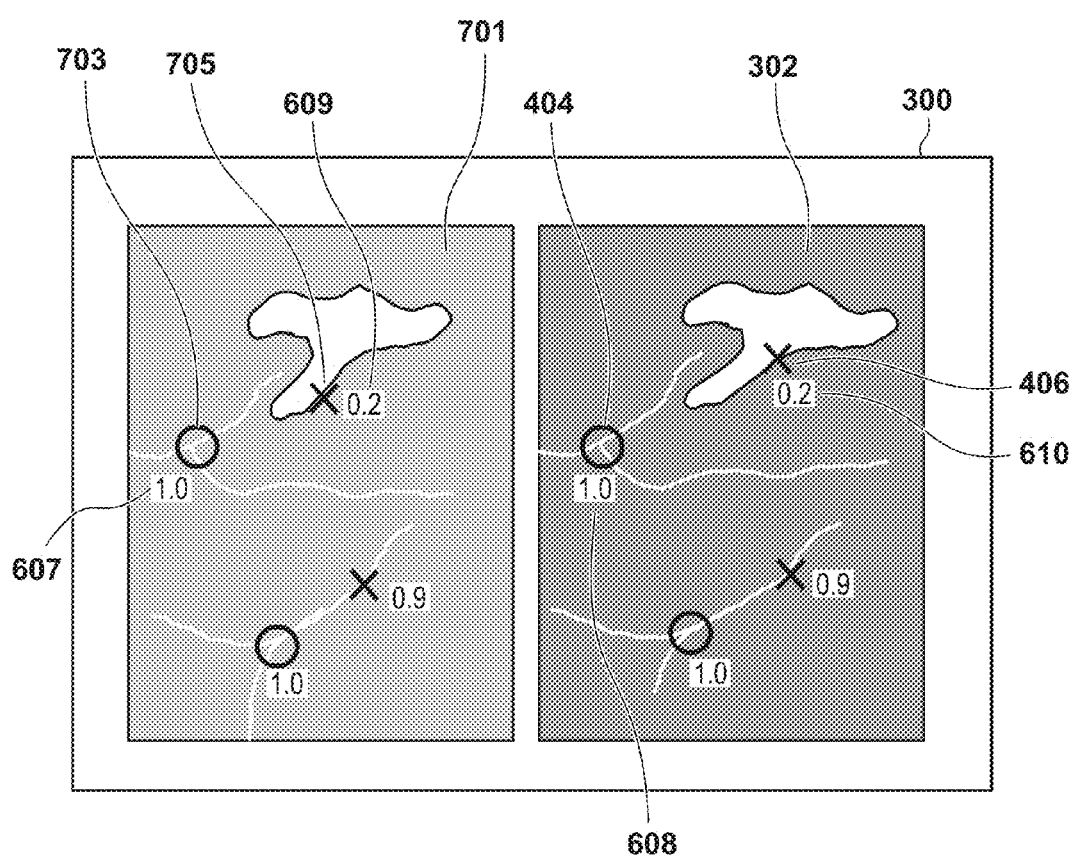
FIG. 7 is a view showing a display screen that displays a deformed image.

In step S209, the display control unit 114 of the image processing apparatus 100 executes display control to display the deformed image generated in step S208 on the display unit 190. FIG. 7 is a view exemplifying the display screen that displays the deformed image. Referring to FIG. 7, the display control unit 114 displays a first cross-sectional image 701 after deformation as the cross-sectional image of the deformed image. In the first cross-sectional image 701 after deformation, a priority feature point 703 after deformation corresponds to the priority feature point 403 shown in FIG. 6 and a nonpriority feature point 705 after deformation corresponds to the nonpriority feature point 405 shown in FIG. 6.

As shown in FIG. 7, based on the result of the registration processing of the registration unit 112, the priority feature point 703 after deformation having the weight 607 of a large value (value=1.0) is registered at a position almost matching the priority feature point 404 on the second cross-sectional image 302.

On the other hand, the nonpriority feature point 705 after deformation having the weight 609 of a small value (value=0.2) is registered at a position away from the nonpriority feature point 405 on the second cross-sectional image 302 based on the result of the registration processing of the registration unit 112. According to this embodiment, the priority feature point pair for which a large weight is always set is registered at the positions matching each other between the images. The nonpriority feature points for which small weights are set (that is, the matching degree to other feature points is small) can remain in a state in which they do not match each other between the images. This can prevent unnatural deformation from occurring by forcibly making the nonpriority feature points, that do not match other feature points including the priority feature points, match each other.

(End Processing)

In step S210, the end determination unit 116 of the image processing apparatus 100 determines whether an end instruction (operator's operation input) has been input. If no end instruction has been input (NO in step S210), the end determination unit 116 returns the process to step S202 to repeat the same processing. On the other hand, if it is determined in step S210 that an end instruction has been input (YES in step S210), the end determination unit 116 ends the processing. The display control unit 114 displays, on the display screen of the display unit 190, a GUI (for example, a window, icons, or radio buttons) used by the operator to select whether to continue (NO in step S210) or end (YES in step S210) the processing. In accordance with the operator's operation input via the GUI, the end determination unit 116 determines whether to end or continue the processing. The image processing apparatus 100 executes the processing in accordance with the above-described processing procedure.

According to this embodiment, feature points (priority feature points) that the operator wants to reliably match can be reliably made to match each other. It is possible to perform registration of nonpriority feature points except the priority feature points in accordance with a matching degree to other feature points. With this processing, even if a nonpriority feature point that is spatially inconsistent with whole feature points including priority feature points exists, it is possible to perform registration so that feature points (priority feature points) that the operator wants to reliably match are reliably made to match each other, and obtain an appropriate registration result in which unnatural deformation is eliminated as a whole.

<Modification 1: Priority Label/Nonpriority Label is Set Later>

In step S203 of FIG. 2 in the first embodiment, for the input feature points obtained in immediately preceding step S202, the display control unit 114 displays, on the display screen 300, the selection input portion 305 (GUI) for selecting the type of feature point (priority feature point or nonpriority feature point). The arrangement has been explained in which the feature point obtaining unit 106 obtains identification information (priority label or nonpriority label) for identifying whether to set the input feature point as a priority feature point or nonpriority feature point in accordance with an operator's instruction input via the operation unit 180. However, an arrangement of obtaining a priority label or nonpriority label is not limited to this.

For example, in step S203, the operator may set a priority label or nonpriority label later without causing the display control unit 114 to display, on the display screen 300, the selection input portion 305 (GUI) immediately after step S202. In this case, the feature point obtaining unit 106 sets the input feature points obtained in immediately preceding step S202 in a state with "no label" without setting a priority label or nonpriority label for the input feature points.

The display control unit 114 obtains, from the feature point obtaining unit 106, pieces of information of the input feature point pairs that have been already input except the input feature points input in immediately preceding step S202, and displays them on the display unit 190. The operator designates, via the operation unit 180, an input feature point pair, to which he/she wants to provide (or change) a priority label or nonpriority label, from all the displayed input feature point pairs. For example, the operator can collectively designate, via the operation unit 180, input feature points to be provided with a priority label or nonpriority label, from the input feature point pairs that are displayed on the display unit 190 and have already been input.

The display control unit 114 displays a selection input portion (GUI) for selecting a priority label or nonpriority label for the designated input feature point pair. The feature point obtaining unit 106 obtains the information of the priority label or nonpriority label selected by the operator on the displayed selection input portion (GUI). The display control unit 114 displays, on the display screen 300, the same selection input portion 305 as in step S203 described above as a selection input portion (GUI) for a succeeding input operation. The operator can collectively set a priority label or nonpriority label for a plurality of input feature point pairs by repeating operation input via the selection input portion (GUI).

<Modification 2: Priority Label/Nonpriority Label is Set as Initial Value>

According to Modification 2 of the first embodiment, the feature point obtaining unit 106 may provide, in advance, "priority label", "nonpriority label", or "no label" for the input feature point pair as an initial value instead of setting a priority label or nonpriority label in step S203. According to this modification, the operator can collectively input a plurality of input feature points without the labor of selecting a priority label or nonpriority label for each input feature point by repeating the processes in steps S202 to S204 until the feature point input processing ends. For the input feature point pairs with "no label", the feature point obtaining unit 106 collectively sets a priority label or nonpriority label later. In this case, the display control unit 114 displays the selection input portion (GUI) for selecting a priority label or nonpriority label, as described in Modification 1. The feature point obtaining unit 106 obtains information of the priority label or nonpriority label selected by the operator in the displayed selection input portion (GUI), and sets the label obtained for the input feature point pairs with "no label" as an initial value.

If the label (priority label or nonpriority label) is not set for the input feature point pairs that has been set with "no label" as an initial value and the operator inputs a feature point input end instruction in step S205, the display control unit 114 displays, on the display unit 190, a notification of notifying the operator that there exists an input feature point pair which has not been set with a priority label or nonpriority label. If the notification is displayed on the display unit 190 by display control of the display control unit 114, the feature point obtaining unit 106 exceptionally advances the process to step S203, and obtains a priority label/nonpriority label to be set for the input feature points (input feature point pair). This allows the operator to set the label for the input feature point pair that has not been set with a priority label or nonpriority label. At this time, the display control unit 114 executes display control to display the input feature point pair that has not been set with a label (priority label or nonpriority label) so as to discriminate it from the input feature point pair that has already been set with a label (priority label or nonpriority label) on the display screen 300. For example, the display control unit 114 executes display control to display, by ○ indicated by dotted lines, the input feature point pair that has not been set with a label (priority label or nonpriority label), like the input feature points 303 and 304 of FIG. 3. Furthermore, the display control unit 114 executes display control to display, by ○ and x indicated by solid lines, the input feature point pair that has been set with a label, similarly to the priority feature points 403 and 404 (priority feature point pair) and nonpriority feature points 405 and 406 (nonpriority feature point pair) of FIG. 4. Such display control allows the operator to recognize an input feature point pair which has not been set with a label (priority label or nonpriority label) among the displayed input feature point pairs.

In step S204, the feature point obtaining unit 106 advances the process to step S205 only if each of all the input feature point pairs has been set with a priority label or nonpriority label. This enables the feature point obtaining unit 106 to set a label (priority label or nonpriority label) so as not to obtain an input feature point pair which has not been set with a priority label or nonpriority label.

<Modification 3: Weight is Set to 0 or 1>

An arrangement example in which the weights of the priority feature point pairs and nonpriority feature point pairs are set in fine stages in step S207 according to the first embodiment has been described. However, setting of the weights is not limited to this. For example, the weight setting unit 110 can set either "1" or "0" for each of the priority feature point pairs and nonpriority feature point pairs. More specifically, since the priority feature point pairs are reliably made to match, the weight setting unit 110 sets the weights of all the priority feature point pairs to "1". With respect to the nonpriority feature point pairs, if the matching degree obtained in step S206 is equal to or higher than a given threshold, the weight setting unit 110 sets, to "1", the weight of the nonpriority feature point pair whose matching degree is equal to or higher than the threshold. If the matching degree is lower than the threshold, the weight setting unit 110 sets, to "0", the weight of the nonpriority feature point whose matching degree is lower than the threshold. For example, the weight setting unit 110 sets the weight of the nonpriority feature point pair to "1" if the matching degree is 0 or more, and sets the weight of the nonpriority feature point pair to "0" if the matching degree is lower than 0. With this processing, the nonpriority feature point pair that has the weight "0" and a matching degree lower than the threshold is ignored. The registration unit 112 performs registration by using all the priority feature point pairs and the nonpriority feature point pairs set with the weight "1", and equally processing the feature points.

The registration unit 112 can apply weights of this modification to, for example, the registration method using the radial basis function (RBF) in step S208. In this case, the registration method using the RBF can make even the nonpriority feature points of each feature point pair with the weight "1" completely match each other while completely ignoring the feature point pairs with the weight "0". An example in which the priority feature point pairs are matching targets has been explained in the first embodiment. According to this modification, in the registration processing not only the priority feature point pairs but also the nonpriority feature point pairs each having a matching degree equal to or higher than the threshold are matching targets. That is, according to this modification, the registration unit 112 can perform registration in a wider range, as compared with the arrangement according to the first embodiment.

<Modification 4: Weights of Priority Feature Points are Set Based on Evaluation Values>

An arrangement example in which weights are set for only the nonpriority feature point pairs based on the evaluation values (matching degrees) and a constant value (1) is set for the priority feature point pairs in steps S206 and S207 according to the first embodiment has been explained. However, setting of the weights of the priority feature point pairs is not limited to this. For example, in step S206, the matching degree calculation unit 108 may calculate not only the matching degrees of the nonpriority feature point pairs but also those of the priority feature point pairs in the same method. In step S207, the weight setting unit 110 may also calculate the weights of the priority feature point pairs based on the matching degrees calculated in step S207. At this time, since the priority feature point pairs are basically feature point pairs that the operator wants to always match, a weight adjustment range is set smaller than that for the nonpriority feature point pairs. Furthermore, the condition that the weights of the priority feature point pairs are larger than those of the nonpriority feature point pairs is always satisfied. For example, based on the value of the matching degree, the weight of the nonpriority feature point pair is set within the range from 0.0 to 0.9, and the weight of the priority feature point pair is set within the range from 0.9 to 1.0. These weights can be calculated by obtaining provisional values of the weights by substituting, for Mj of equation (2), each of $M_{n,j}$ and $M_{p,i}$ calculated as the matching degrees of the nonpriority feature point pair and priority feature point pair in step S206, and normalizing each provisional value within the corresponding setting range described above. Thus, it is possible to set a weight for the priority feature point pair in consideration of the matching degree to other feature point pairs. Even if the feature point pair input by the operator is spatially inconsistent with whole feature point pairs, it is possible to obtain a registration result with a slightly small matching degree of positions.

<Modification 5: Feature Points Need not be Points having One-to-One Correspondence between Images>

According to the first embodiment, the priority feature points or nonpriority feature points are points having a one-to-one correspondence between the first and second images. However, the priority feature points or nonpriority feature points need not be points having a one-to-one correspondence between the images, and may be, for example, feature points which have been obtained from one of the first and second images and for which the coordinates of corresponding points on the other image are unknown. With respect to processing steps when no corresponding points are provided as feature points, the difference from the embodiment will be described below.

In step S201, the feature point extraction unit 104 extracts extracted feature points from at least one of the first and second images. At this time, association processing of the feature points between the images is not performed. The feature point obtaining unit 106 determines all the extracted feature points (that are not paired) as nonpriority feature points.

In step S202, the feature point obtaining unit 106 obtains the input feature points input by the operator with respect to at least one of the first and second images. Similarly, at this time, the feature points are not associated with each other between the images.

In steps S203 and S204, based on the priority label or nonpriority label provided by the operator, the feature point obtaining unit 106 determines whether each of the input feature points (that are not paired) is a priority feature point or nonpriority feature point.

In step S206, the matching degree calculation unit 108 calculates, for each of the nonpriority feature points (that are not paired), a matching degree to the remaining feature points.

In step S501 as the internal processing of step S206, the matching degree calculation unit 108 calculates the first displacement field based on the feature points (that are not paired) obtained by excluding the feature point of interest from all the feature points. At this time, since the feature points are not associated with each other, it is impossible to obtain the displacement field by the method of displacing the image so as to match the position of the feature point pair, which has been explained in step S501. To cope with this, for example, a region of interest (ROI) is set near the feature point given on the first image, and the image non-similarity between the region of interest (ROI) and a corresponding region on the second image is calculated at each position while moving the set region of interest (ROI) over the second image. A non-similarity function having each position on the second image as a variable is obtained. A displacement field is calculated by obtaining a non-similarity function for each feature point, defining the sum of the non-similarity functions as an evaluation function, and displacing the first image toward the second image so as to minimize the value of the evaluation function as much as possible using optimization processing. This can obtain a displacement field such that a region near the feature point on the first image is generally close to a region similar to it on the second image even if no corresponding points are given as feature points.

If, for example, it is known in advance that deformation between the images is small, the non-similarity function is calculated only once before deformation of the image; otherwise, the non-similarity function is recalculated and updated every time the deformation amount between the images becomes larger than a given value. In calculation of the deformation amount, for example, the average value of the deformation amounts at the respective positions in the displacement field between the images is adopted, and the value is reset every time the non-similarity function is updated.

In step S502, the matching degree calculation unit 108 also calculates the second displacement field based on all the feature points (that are not paired). A displacement field calculation method is the same as in step S501 and a description thereof will be omitted. The matching degree of the feature point of interest is calculated in step S503, and the weight setting unit 110 sets the weights of the priority feature points and nonpriority feature points in step S207. These two processes are obtained by replacing the feature point pairs in the original processes by the feature points that are not associated with each other and a detailed description thereof will be omitted.

In step S208, based on the priority feature points (that are not paired), the values of the weights of the priority feature points, the nonpriority feature points (that are not paired), and the values of the weights of the nonpriority feature points, the registration unit 112 performs processing of deforming the first image and registering it with the second image. More specifically, a non-similarity function is calculated for each feature point by the same method as in the processing in step S501 according to this modification described above. An expression obtained by multiplying the non-similarity function of each feature point by the weight of each feature point, and calculating the sum of the multiplication results of the feature points is defined as a term $\theta'$. This term $\theta'$ is defined as an evaluation function E' of registration according to this modification. It is possible to perform registration of the two images so that the feature point in one image matches a similar region in the other image as much as possible in consideration of the weights of the respective feature points by minimizing the evaluation function E'. With this processing, even if the feature points are not points having a one-to-one correspondence between the first and second images and are obtained from one of the images, it is possible to obtain an appropriate registration result in which feature points that the operator wants to reliably match are reliably made to match each other, and unnatural deformation is eliminated as a whole. Note that feature points that are associated with each other between the images and feature points that are not associated with each other between the images may be used in combination (together).

For example, the extracted feature points may undergo up to association processing (the extracted feature points may be processed as extracted feature point pairs), or the input feature points may undergo up to designation of corresponding points (the input feature points may be processed as input feature point pairs). The extracted feature points or input feature points may include feature points that are associated with each other and feature points that are not associated with each other. In these cases, the sum of evaluation terms defined in accordance with the respective states (whether the feature points are associated with each other) is defined as an evaluation function.

<Second Embodiment: Weighting of Nonpriority Feature Points Based on Association Reliability Degree>

In the first embodiment, an arrangement of setting, for each nonpriority feature point, a weight for registration using an evaluation value based on the matching degree to other feature points has been described. An evaluation value for setting a weight is not limited to this.

In the second embodiment, an arrangement of adding, to each nonpriority feature point, a weight for registration using the association reliability degree of the feature point as an evaluation value will be described. That is, if the association reliability degree of the nonpriority feature point is low, the weight of the nonpriority feature point is set small. If the association reliability degree of the nonpriority feature point is high, the weight of the nonpriority feature point is set large. Hence, even if feature points that are erroneously associated with each other exist, it is possible to obtain an appropriate registration result in which feature points that the operator wants to match are reliably made to match, and unnatural association is eliminated. An image processing apparatus according to the second embodiment will be described below with respect to the difference from the first embodiment.

Figure 8:
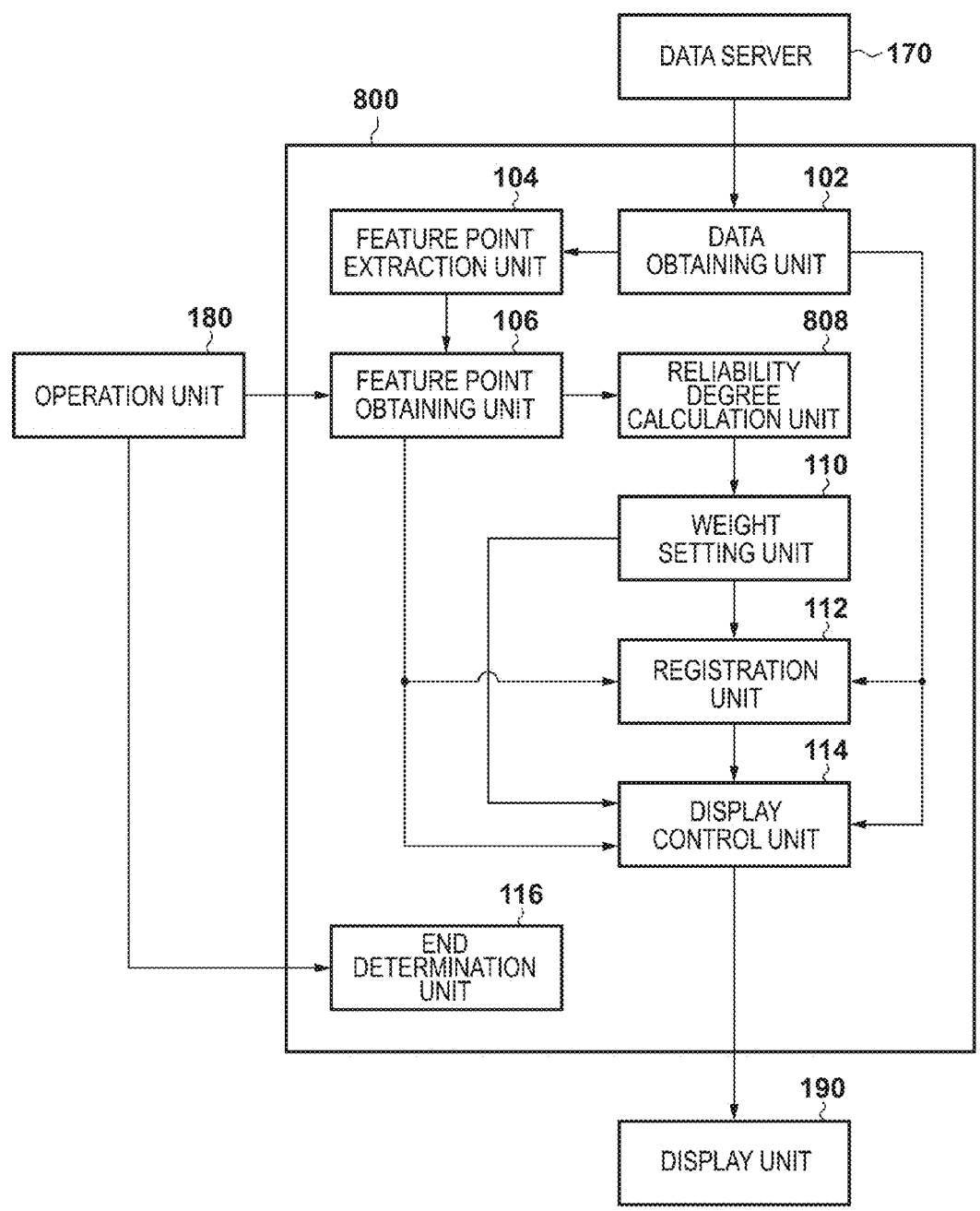
FIG. 8 is a block diagram showing an example of the arrangement of an image processing apparatus according to the second embodiment.

FIG. 8 is a block diagram showing an example of the arrangement of an image processing system including an image processing apparatus 800 according to the second embodiment. Referring to FIG. 8, the image processing apparatus 800 has the same arrangement as that of the image processing apparatus 100 except that a reliability degree calculation unit 808 is included instead of the matching degree calculation unit 108 of the image processing apparatus 100 shown in FIG. 1. A description of the same components will be omitted.

The reliability degree calculation unit 808 can calculate, as an evaluation value of each nonpriority feature point, the association reliability degree between a first image and a second image with respect to each nonpriority feature point. That is, based on the image similarity between the first and second images with respect to each nonpriority feature point, the reliability degree calculation unit 808 calculates the association reliability degree of the nonpriority feature point as an evaluation value. For example, with respect to each nonpriority feature point, the reliability degree calculation unit 808 calculates the association reliability degree based on the image similarity near the nonpriority feature point. The reliability degree calculation unit 808 outputs the calculated reliability degree to a weight setting unit 110. The weight setting unit 110 sets a weight for the nonpriority feature point based on the reliability degree.

Figure 9:
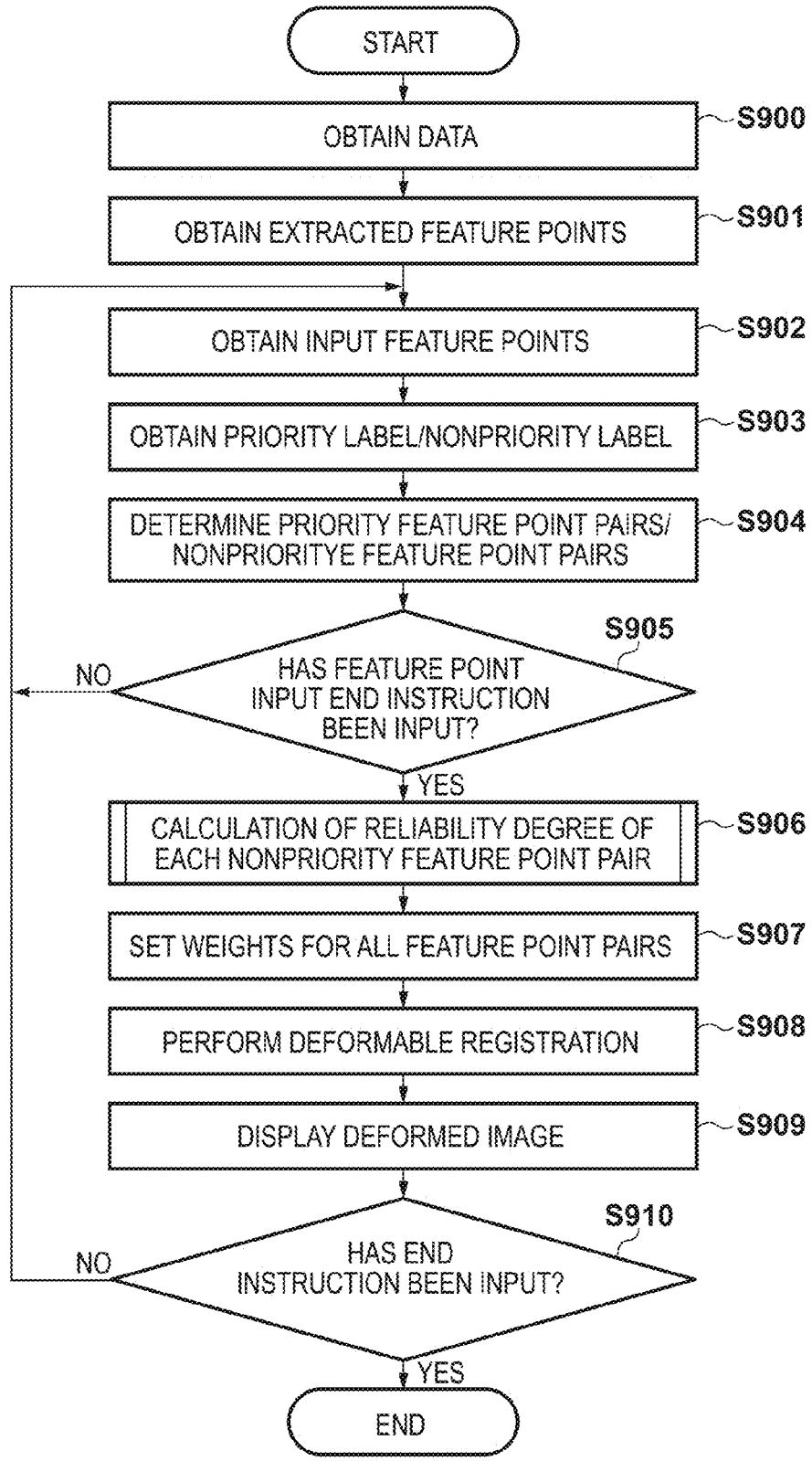
FIG. 9 is a flowchart showing a processing procedure performed by the image processing apparatus according to the second embodiment.

FIG. 9 is a flowchart showing an overall processing procedure performed by the image processing apparatus 800. Note that processes in steps S900 to S905 and S908 to S910 of FIG. 9 are the same as those in steps S200 to S205 and S208 to S210 of FIG. 2 according to the first embodiment and a description thereof will be omitted.

(Calculation of Reliability Degree of Each Nonpriority Feature Point)

Figure 10:
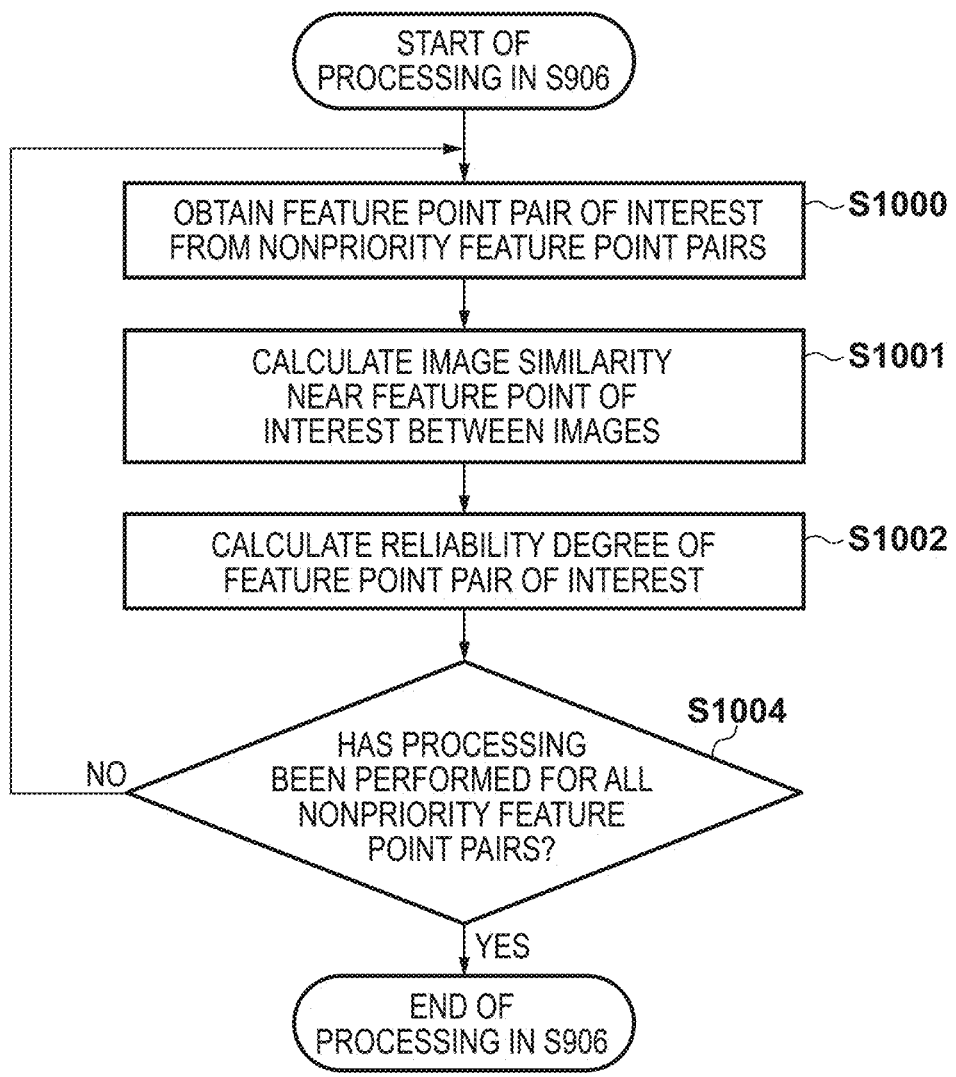
FIG. 10 is a flowchart showing a processing procedure of calculating the reliability degree of each nonpriority feature point.

In step S906, the reliability degree calculation unit 808 calculates, for each point of the nonpriority feature point pair, the association reliability degree based on the image similarity near the point. The reliability degree calculation unit 808 transmits the calculated reliability degree to the weight setting unit 110. Details of the reliability degree calculation processing in step S906 will be described below with reference to a flowchart shown in FIG. 10. Note that processes in steps S1000 and S1004 of FIG. 10 are the same as those in steps S500 and S504 of FIG. 5 described in the first embodiment and a description thereof will be omitted.

(S1001)

In step S1001, with respect to a feature point pair of interest, based on the image similarity near the feature points of interest on the respective images, the reliability degree calculation unit 808 calculates the association reliability degree of the feature point of interest. The association reliability degree here is obtained by quantifying a reliability degree at which the feature point in the first image and that in the second image are associated with each other. In this embodiment, for example, if the similarity between an image near the feature point of interest in the first image and a corresponding image near the feature point of interest in the second image is high, it is interpreted that anatomical features near the feature points of interest match more, thereby evaluating that the reliability degree is high. Practical processing will be described below.

The reliability degree calculation unit 808 obtains an image near the feature point of interest in the first image as region 1 of interest. Similarly, the reliability degree calculation unit 808 obtains an image near the feature point of interest in the second image as region 2 of interest. As a method of setting a region of interest, for example, a spherical region with the feature point of interest as its center and a predetermined radius (for example, 5 mm) is set. Alternatively, a rectangular region (for example, a region of a rectangular parallelepiped) with the feature point of interest as its center and predetermined lengths may be set. Next, the reliability degree calculation unit 808 calculates the image similarity between region 1 of interest and region 2 of interest. The reliability degree calculation unit 808 uses, as an image similarity obtaining method, the same method as the processing method of calculating the image similarity used in step S201 of the first embodiment. The reliability degree calculation unit 808 can use a known method using, for example, the sum of squared difference (SSD), the sum of absolute difference (SAD), or a cross-correlation coefficient. An example of calculating the image similarity by the SSD will be described below. However, it is possible to equally apply the processing of this embodiment to other methods. The similarity between the regions of interest will be described as a value $R_{SSD}$ of the SSD hereinafter. As the value $R_{SSD}$ is smaller, the images are more similar to each other. That is, as the value $R_{SSD}$ is smaller, the image similarity is higher.

(S1002)

In step S1002, the reliability degree calculation unit 808 calculates a reliability degree S based on the image similarity near the feature point pair of interest between the first and second images. The reliability degree calculation unit 808 calculates the reliability degree S as a value obtained by normalizing the image similarity $R_{SSD}$ within the range from 0 to 1 by:

$$S=1-R_{SSD}/(1+R_{SSD}) \qquad (5)$$

If the image similarity $R_{SSD}$ is 0 (in this case, this means that the two images match), the reliability degree calculation unit 808 obtains 1 as the reliability degree S. Conversely, if the image similarity $R_{SSD}$ is infinitely large (in this case, this means that the two images do not match at all), the reliability degree calculation unit 808 obtains a value infinitely close to 0 as the reliability degree S.

Note that in this embodiment, the reliability degree calculation method using the SSD has been described as an image similarity calculation method. However, any other image similarity calculation methods may be used as long as a value obtained by a calculation method is normalized within a predetermined range. As described above, the reliability degree calculation unit 808 can calculate the association reliability degree S for each nonpriority feature point pair. Furthermore, the reliability degree calculation method is not limited to the method based on the image similarity that directly uses luminance information. For example, the reliability degree may be calculated based on the similarity between various feature amounts (luminance values, shapes, textures, and the like) obtained by analyzing the peripheral images of the feature points.

(S907)

Referring back to FIG. 9, in step S907, the weight setting unit 110 sets weights for registration for all the feature point pairs (priority feature point pairs and nonpriority feature point pairs). The weight setting unit 110 transmits the values of the set weights to the registration unit 112 and the display control unit 114. The weight setting unit 110 sets weights for the priority feature point pairs by the same method as the setting method described in the first embodiment. A practical setting method is the same as in step S207 according to the first embodiment and a description thereof will be omitted.

For each nonpriority feature point pair, the weight setting unit 110 sets a weight for registration based on the reliability degree of the nonpriority feature point pair calculated by the reliability degree calculation unit 808 in step S1002 of FIG. 10. For a description of a method of setting a weight for each nonpriority feature point pair, the nonpriority feature point pair is represented by $P_{n,j}$ ($0 \leq j \leq N_n$ where $N_n$ represents the number of nonpriority feature point pairs), similarly to step S207 of FIG. 2. Furthermore, a reliability degree corresponding to the nonpriority feature point pair $P_{n,j}$ is represented by $S_j$. In this case, in general, a weight for registration is 0 or more, and the value of the reliability degree $S_j$ falls within the range of $0 < M_j \leq 1$. Thus, the reliability degree $S_j$ is directly set as a weight $w_{n,j}$ ($w_{n,j}=S_j$). The processing of the image processing apparatus 800 is performed as described above.

According to this embodiment, feature points (priority feature points) that the operator wants to reliably match can be reliably made to match each other. With respect to nonpriority feature points other than the priority feature points, it is possible to perform registration in accordance with the association reliability degree. Consequently, even if feature points that are erroneously associated with each other exist, it is possible to obtain an appropriate registration result in which feature points that the operator wants to reliably match are reliably made to match each other, and unnatural association is eliminated.

<Third Embodiment: Input of Priority in Multiple Stages>

In the first and second embodiments, feature points are input by classifying them into priority feature points and nonpriority feature points. However, a classification method used by the operator to input feature points is not limited to this.

In the third embodiment, an arrangement of allowing the operator to input feature points by classifying, into multiple stages, the priorities of the feature points that the operator wants to reliably match. This can reflect, to registration of the feature points, priorities corresponding to the matching degrees of the positions of the input feature points intended by the operator, thereby obtaining a registration result desired more by the operator. An image processing apparatus according to the third embodiment will be described below with respect to the difference from the first embodiment.

The arrangement of an image processing system including the image processing apparatus according to the third embodiment is the same as that shown in FIG. 1. An overall processing procedure performed by the image processing apparatus according to the third embodiment is the same as that shown in FIG. 2. Note that some of the processing contents of respective steps are different from the first embodiment, as will be described below. Note that processes in steps S200, S202, S205, S206, and S208 to S210 are the same as in the first embodiment and a description thereof will be omitted.

(Obtaining of Priority)

In step S203, a feature point obtaining unit 106 of an image processing apparatus 100 obtains, in accordance with an operator's instruction, a priority to be set for the input feature points (input feature point pair) obtained in step S202. Details will be described below.

Figure 14:
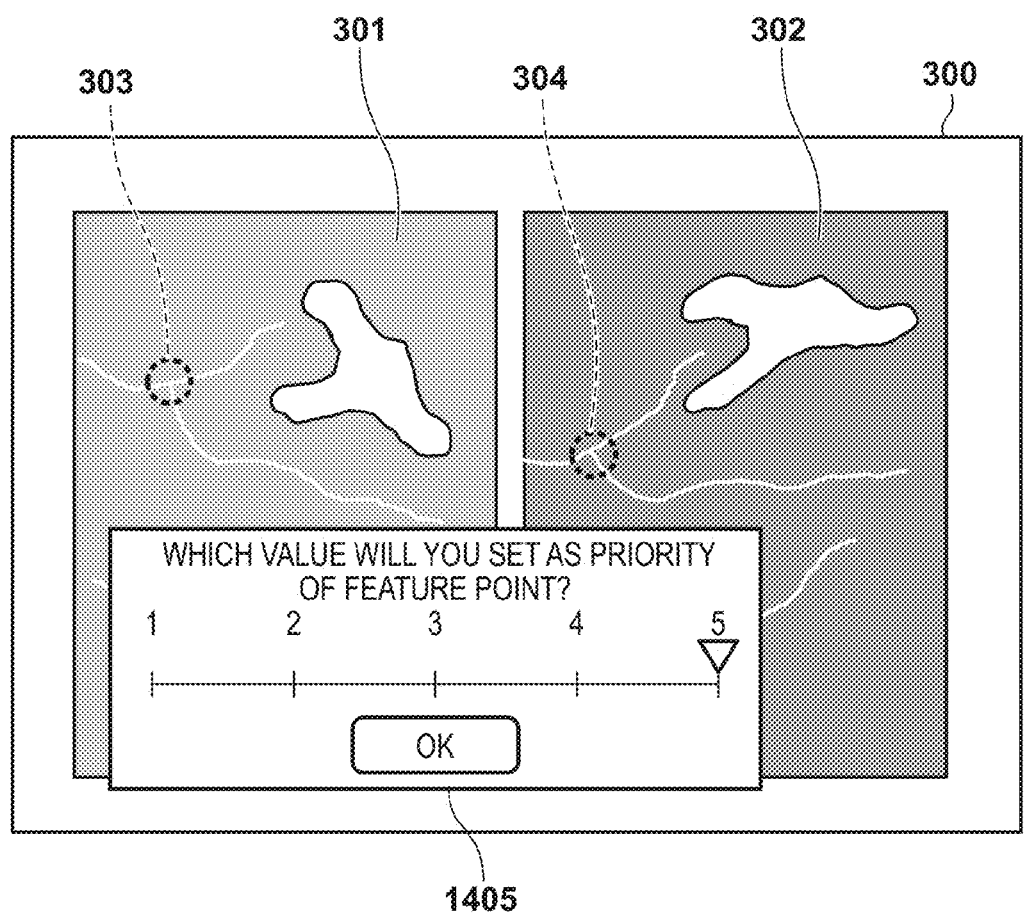
FIG. 14 is a view showing a screen used to set a priority for an input feature point.

FIG. 14 is a view exemplifying a display screen 300 of a display unit 190 used by the operator to set a priority for the input feature points. A display control unit 114 displays, on the display unit 190, a priority setting portion in which a priority indicating the matching degree of the feature points is settable by numerical information. That is, the display control unit 114 displays, on the display unit 190, a priority setting portion 1405 in which a priority indicating a priority order for the input feature point pair is settable by numerical information after the input feature point pair is obtained in step S202.

In the priority setting portion 1405, a priority indicating a priority order for making feature points match each other can be set as numerical information in multiple stages (for example, five stages of "1 to 5"). The priority setting portion 1405 includes a setting scale by which a priority indicating a priority order can be set in multiple stages, as indicated by "1 to 5". When the operator presses an OK button by moving a setting slider along the setting scale, it is possible to set a priority indicating a priority order for the input feature point pair. A feature point obtaining unit 106 can set priority feature points and nonpriority feature points in accordance with the setting of the priority setting portion 1405.

As the numerical value of the priority set here is larger, the matching degree (priority) of the feature points is higher. For example, if the operator presses the OK button of the priority setting portion 1405 by moving the setting slider to a position on the setting scale of the priority setting portion 1405, at which "5" is displayed, the feature point obtaining unit 106 of the image processing apparatus 100 sets the priority "5" for the input feature point pair. Alternatively, if the operator presses the OK button of the priority setting portion 1405 by moving the setting slider to a position on the setting scale of the priority setting portion 1405, at which "1" is displayed, the feature point obtaining unit 106 of the image processing apparatus 100 sets the priority "1" for the input feature point pair.

Similarly, if the setting slider is moved to the position of another numerical value on the setting scale, the feature point obtaining unit 106 of the image processing apparatus 100 can set a priority for the input feature point pair in accordance with the position of the setting slider moved on the setting scale. Note that display for prompting the operator to select a priority is not limited to the display example shown in FIG. 14. Any method may be used as long as it is possible to set a priority in multiple stages. For example, the display control unit 114 can display, in a region of the display screen 300, five radio buttons of "1 to 5" as a priority setting portion for prompting the operator to select a priority. When setting a priority, the operator selects a priority in terms of the confidence degree of the input feature points. Examples of the input feature points set with the priority "5" are feature points whose 3D positions can be specified by the operator and that can be identified between the images, such as a branch portion of a blood vessel of an object. Furthermore, examples of the input feature points set with the priority "1" are feature points including ambiguity that makes it difficult to specify a clear correspondence between the 3D positions of the feature points in determination of the operator.

(Determination of Priority Feature Points/Nonpriority Feature Points)

In step S204, the feature point obtaining unit 106 of the image processing apparatus 100 sets priority feature points and nonpriority feature points in accordance with the setting of the priority setting portion 1405. For example, the feature point obtaining unit 106 determines priority feature point pairs and nonpriority feature point pairs based on the information of the priorities set for the input feature point pairs and the information of extracted feature point pairs. The feature point obtaining unit 106 determines, as priority feature point pairs, the input feature point pairs set with the priority "5". The feature point obtaining unit 106 determines, as nonpriority feature point pairs, the input feature point pairs each set with one of the priorities "1" to "4".

At this time, the feature point obtaining unit 106 sets, for the nonpriority feature point pairs, priority coefficients corresponding to the priorities set for the input feature point pairs. In this embodiment, the feature point obtaining unit 106 sets, for example, priority coefficients "0.25", "0.5", "0.75", and "1.0" that respectively correspond to the priorities "1", "2", "3", and "4". Note that the feature point obtaining unit 106, for example, equally sets the priority coefficient "1.0" for the nonpriority feature point pairs generated from the extracted feature point pairs set with no priorities.

Note that setting of the priority coefficients has been exemplified but a method of providing priority coefficients is not limited to this. For example, values may be set so that the minimum value of the priority coefficients is "1.0" in accordance with the priorities. Furthermore, for example, a priority coefficient "0.5" may be equally set for the extracted feature point pairs. The feature point obtaining unit 106 can also set a priority coefficient in accordance with the image similarity between the feature point pairs. In this case, the priority coefficient is equal to the association reliability degree in the second embodiment, and a detailed description of a setting method will be omitted. The feature point obtaining unit 106 stores the information of the set priority coefficients in a storage unit (not shown).

(Setting of Weights of Feature Point Pairs)

In step S207, the weight setting unit 110 sets weights for registration for all the feature point pairs (priority feature point pairs and nonpriority feature point pairs) based on the priority coefficient and the matching degree of each nonpriority feature point pair. The weight setting unit 110 sets weights for the priority feature point pairs by the same method as in the first embodiment. The setting method is the same as in the first embodiment and a repetitive description thereof will be omitted.

The weight setting unit 110 sets a weight for each nonpriority feature point pair based on the matching degree of each nonpriority feature point pair and the set priority coefficient. Let $P_{n,j}$, $M_j$, and $w_{n,j}$ be each nonpriority feature point pair and a matching degree and weight corresponding to it, respectively, similarly to the first embodiment. Furthermore, let $c_j$ be a priority coefficient corresponding to the nonpriority feature point pair $P_{n,j}$. Then, the weight setting unit 110 calculates a weight by:

$$w_{n,j} = c_j \cdot (0.5 \cdot M_j + 0.5) \tag{6}$$

The weight setting unit 110 can set a weight based on a value obtained by multiplying the matching degree $M_j$ by the priority coefficient $c_j$. According to this embodiment, the operator can set a weight for registration by reflecting the viewpoint (confidence degree) of how much the operator is confident with respect to the input feature points.

In the above-described processing example, the feature point obtaining unit 106 classifies only feature point pairs set with the priority "5" into priority feature point pairs, and thus the priority feature point pairs are not classified into stages. However, the priority criterion (reference priority) of classifying feature point pairs into priority feature point pairs and nonpriority feature point pairs is not limited to the above processing example. For example, whether the priority is smaller than the priority "4" may be set as a reference priority for classifying feature point pairs into priority feature point pairs and nonpriority feature point pairs. In this case, the feature point obtaining unit 106 classifies, as priority feature point pairs, the two kinds of feature point pairs set with the priorities "4" and "5". In this case, the priority feature point pairs with the priority "5" are feature point pairs that are most preferentially made to match between the images. Therefore, as in step S208 of the first embodiment, after registration by weighting the feature points using free-form deformation (FFD), the registration unit 112 performs registration using the radial basis function (RBF) to completely match the feature point pairs.

On the other hand, since the priority feature point pairs with the priority "4" are lower in the matching priority than the priority feature point pairs with the priority "5", the registration unit 112 performs no RBF processing. This enables the registration unit 112 to classify the matching degrees of the priority feature point pairs into stages. Note that the operator need not explicitly provide priorities. For example, the operator may input portion names (for example, a nipple, a blood vessel branch, and the like) to the input feature points, and provide a predetermined priority (held in a lookup table or the like) based on the importance of each portion for each portion name. The priority feature points may be classified into more preferential feature points (feature points to undergo RBF processing) and other feature points in accordance with the presence/absence of input of a portion name and the input portion name.

According to this embodiment, it is possible to perform registration based on a weight for registration set by reflecting the viewpoint (confidence degree) of how much the operator is confident with respect to the input feature points. According to this embodiment, therefore, it is possible to match the positions of desired feature points at a degree corresponding to the confidence degree of the operator, and thus obtain a registration result desired more by the operator.

<Fourth Embodiment: Weighting of Nonpriority Feature Point Based on Influence Degree on Priority Feature Points>

In the first embodiment, a weight for registration is set using only the matching degree to other feature points as an evaluation value for each nonpriority feature point. However, an evaluation value for setting a weight is not limited to this. In the fourth embodiment, an arrangement of adding, for each nonpriority feature point, a weight for registration based on an evaluation value obtained by considering the matching degree to other feature points and the influence degree of the nonpriority feature point on priority feature points will be described.

More specifically, this embodiment assumes a case in which the operator further adds priority feature points after performing deformable registration once using a weight based on a matching degree. With respect to each of the already input nonpriority feature points, if its influence degree on the newly added priority feature points is high, the weight of the nonpriority feature point is set to 0. This can reduce the influence of the nonpriority feature point having a high influence degree. Furthermore, with respect to each nonpriority feature point, if its influence degree on the newly added priority feature points is low, registration is performed based on an appropriate weight set in the last registration. An image processing apparatus 1100 according to the fourth embodiment will be described below with respect to only the difference from the first embodiment.

Figure 11:
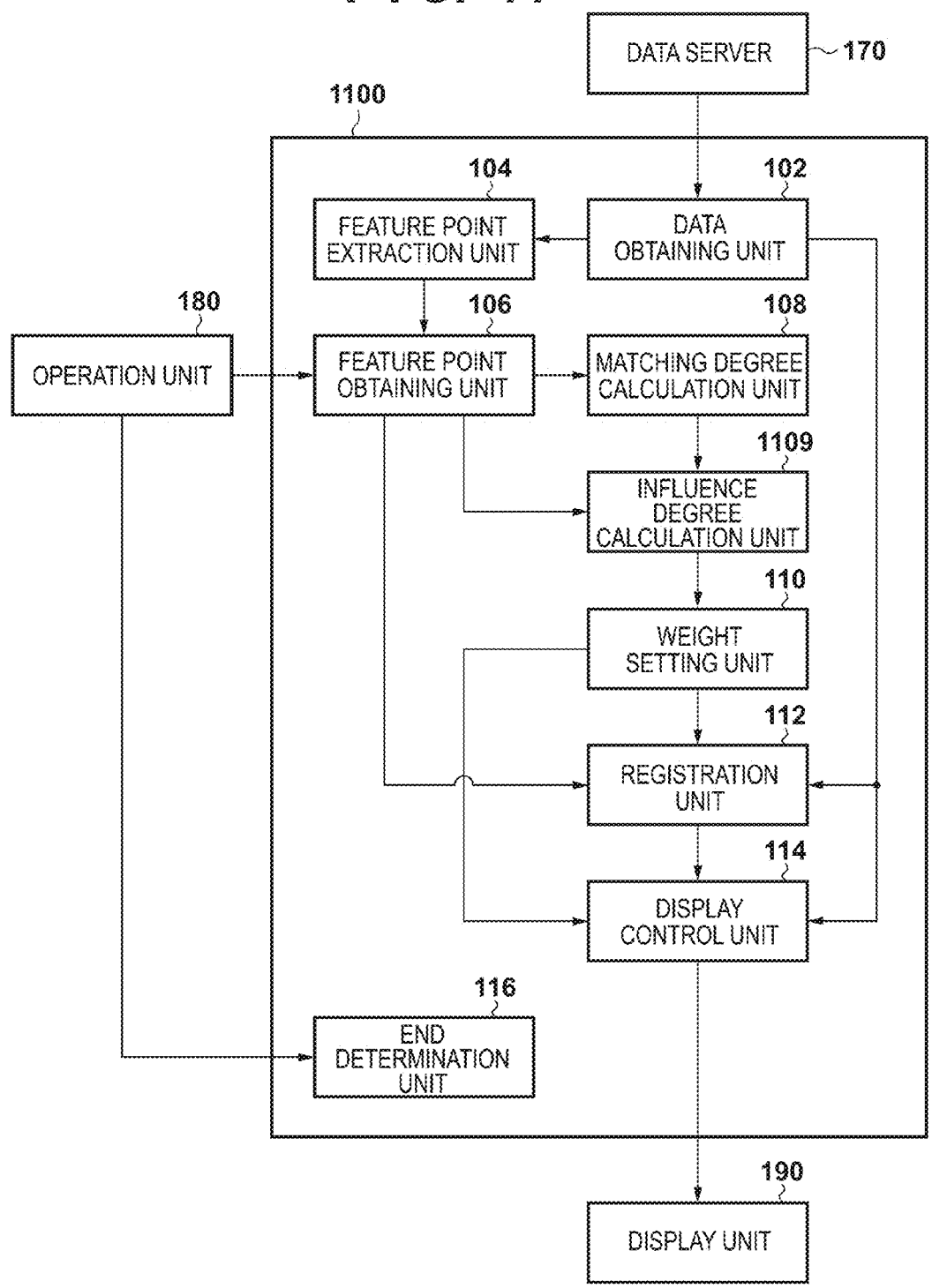
FIG. 11 is a block diagram showing an example of the arrangement of an image processing apparatus according to the fourth embodiment.

FIG. 11 is a block diagram showing an example of the arrangement of an image processing system including the image processing apparatus 1100 according to the fourth embodiment. Referring to FIG. 11, the image processing apparatus 1100 includes an influence degree calculation unit 1109 with respect to the image processing apparatus 100 shown in FIG. 1. In the arrangement of the image processing apparatus 1100, components except the influence degree calculation unit 1109 are the same as those of the image processing apparatus 100 described in the first embodiment, and a repetitive description thereof will be omitted.

The influence degree calculation unit 1109 can calculate, as the evaluation value of each nonpriority feature point, the influence degree of the nonpriority feature point on a priority feature point based on the relative positional relationship between the priority feature point and the nonpriority feature point. For example, the influence degree calculation unit 1109 calculates, for each nonpriority feature point, its influence degree on the newly added priority feature points. The influence degree calculation unit 1109 then outputs the calculated influence degree to a weight setting unit 110.

Figure 12:
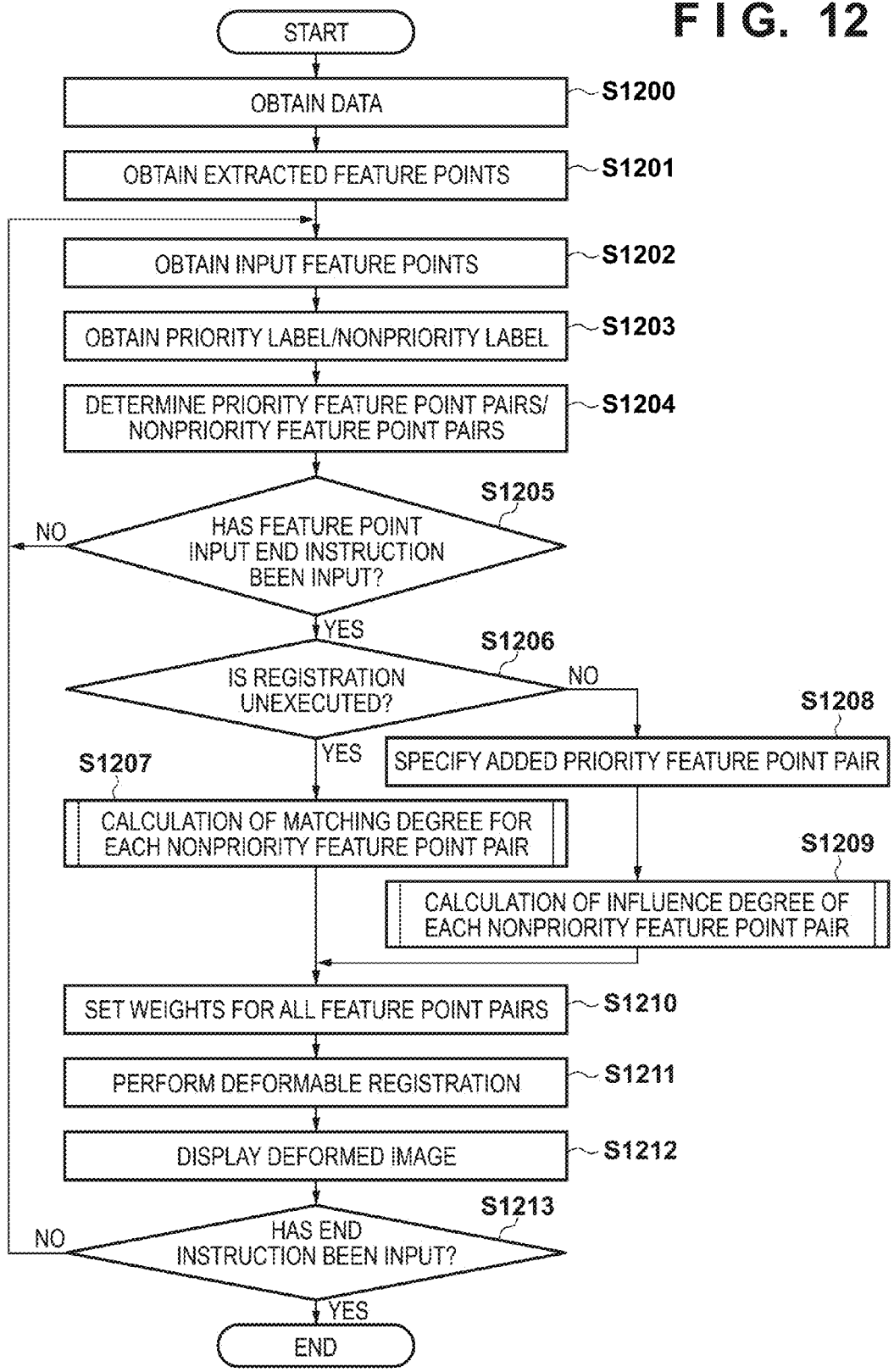
FIG. 12 is a flowchart showing a processing procedure performed by the image processing apparatus according to the fourth embodiment.

FIG. 12 is a flowchart showing an overall processing procedure performed by the image processing apparatus 1100. Note that processes in steps S1200 to S1203, S1205, S1207, and S1211 to S1213 of FIG. 12 are the same as those in steps S200 to S203, S205, S206, and S208 to S210 of FIG. 2 in the first embodiment, and a description thereof will be omitted.

(Determination of Priority Feature Point Pairs/Nonpriority Feature Point Pairs)

In step S1204, a feature point obtaining unit 106 determines priority feature point pairs and nonpriority feature point pairs based on the information of a priority label or nonpriority label set for input feature point pairs. Practical processing is the same as that in step S204 of the first embodiment and a description thereof will be omitted.

In this step, the feature point obtaining unit 106 stores the determined priority feature point pairs and nonpriority feature point pairs in a storage unit (not shown). In this embodiment, even if a registration loop in steps S1202 to S1213 is executed a plurality of times, the stored information of the priority feature points and nonpriority feature point pairs is newly stored in another area without being overwritten, and held in the storage unit.

(Determination of whether Registration is Unexecuted)

In step S1206, the feature point obtaining unit 106 determines whether registration is unexecuted. If it is determined that registration is unexecuted (YES in step S1206), the feature point obtaining unit 106 outputs the information of the feature point pairs to the reliability degree calculation unit 808, and advances the process to step S1207.

On the other hand, if the feature point obtaining unit 106 determines in step S1206 that registration has been executed (NO in step S1206), it outputs the information of the feature point pairs to the influence degree calculation unit 1109, and advances the process to step S1208.

In the determination processing in step S1206, the feature point obtaining unit 106 determines whether registration is unexecuted, by referring to determination information representing whether registration has been executed. That is, the feature point obtaining unit 106 refers to determination information (registration flag) representing whether registration has been executed, that is stored in the storage unit (not shown). If the value of the determination information (registration flag) is "false", the feature point obtaining unit 106 determines that registration is unexecuted. On the other hand, if the value of the determination information (registration flag) is "true", the feature point obtaining unit 106 determines that registration has been executed. Note that if the initial value of the determination information (registration flag) is set in a state of "false" and a registration unit 112 executes registration in step S1211, the registration unit 112 changes the setting from the initial value "false" to "true". If it is determined that registration has been executed, the influence degree calculation unit 1109 calculates the influence degree of each nonpriority feature point on the priority feature points newly added after registration.

(Specifying of Added Priority Feature Point Pair)

In step S1208, the feature point obtaining unit 106 specifies the newly added priority feature point pair. The newly added priority feature point pair indicates a priority feature point pair newly input by the operator after deformable registration processing is performed at least once. More specifically, the feature point obtaining unit 106 obtains the information of the priority feature point pairs stored in the storage unit (not shown) in step S1204 in the last registration loop, and the information of the priority feature point pairs stored in the storage unit (not shown) in step S1204 this time. The feature point obtaining unit 106 specifies the newly added priority feature point pair (called the added priority feature point pair) based on the difference between this information of the priority feature point pair and the last information of the priority feature point pair. An expression "added priority feature point pair" is used independently of whether a single or a plurality of added priority feature point pairs are specified here.

(Calculation of Influence Degree of Each Nonpriority Feature Point Pair)

In step S1209, the influence degree calculation unit 1109 calculates, for each nonpriority feature point pair, an influence degree on the added priority feature point pair specified in step S1208. That is, the feature point obtaining unit 106 determines whether registration is unexecuted, by referring to the determination information representing whether registration has been executed. If it is determined that registration has been executed, the influence degree calculation unit 1109 calculates the influence degree of each nonpriority feature point pair on the priority feature point pair newly added after registration. The influence degree calculation unit 1109 transmits the calculated influence degree to the weight setting unit 110.

Figure 13:
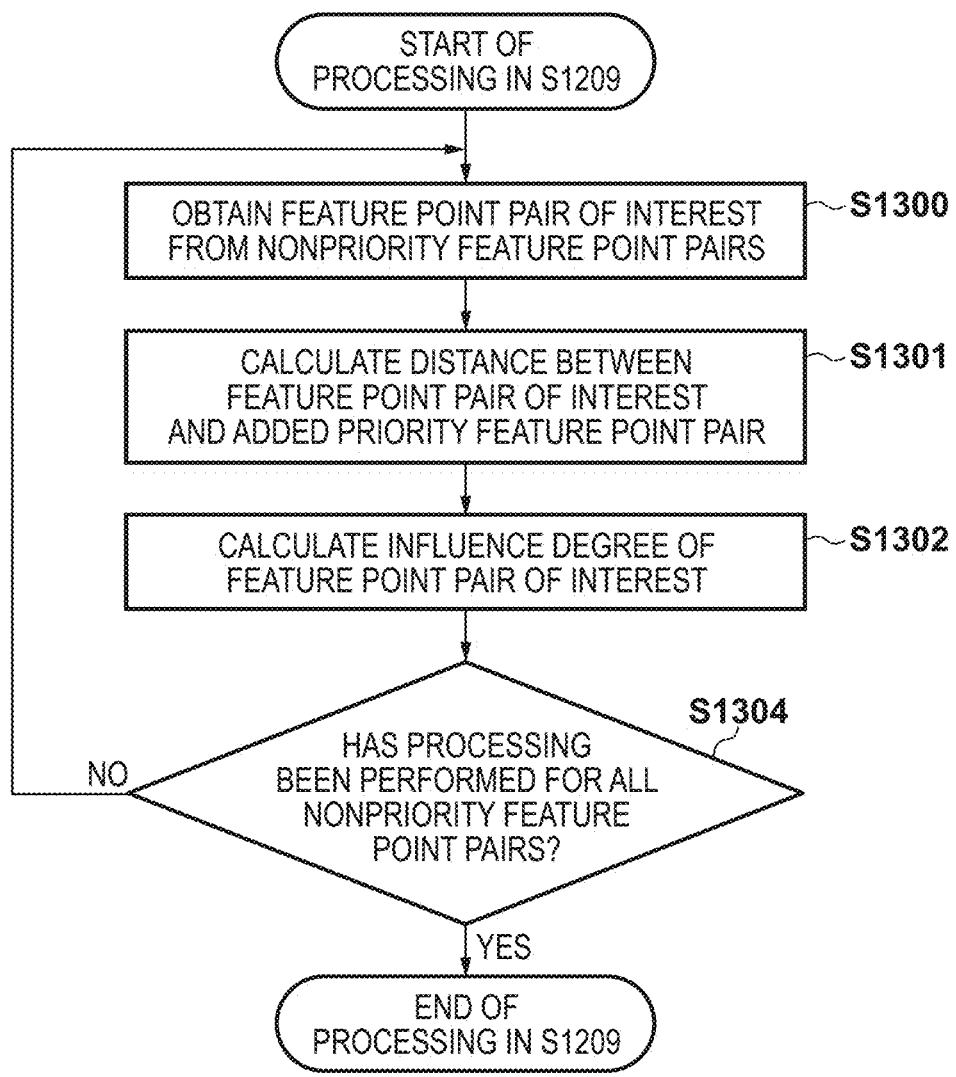
FIG. 13 is a flowchart showing a processing procedure of calculating the influence degree of each nonpriority feature point.

Details of the calculation processing in step S1209 of calculating the influence degree of each nonpriority feature point pair will be described below with reference to a flowchart shown in FIG. 13. Note that processes in steps S1300 and S1304 are the same as those in steps S500 and S504 according to the first embodiment and a repetitive description thereof will be omitted.

(S1301)

In step S1301, the influence degree calculation unit 1109 calculates the distance between a feature point pair of interest and the added priority feature point pair. Practical processing will be described below. First, letting $P_m$ be the feature point pair of interest, $x_{1,m}$ and $x_{2,m}$ represent the coordinates of the feature point pair $P_m$ of interest in first and second images. Letting $P_{a,k}$ ($0 \leq k \leq N_a$ where $N_a$ represents the number of added priority feature point pairs) be the added priority feature point pair, $x_{1,k}$ and $x_{2,k}$ represent the coordinates of the added priority feature point pair $P_{a,k}$ in the first and second images. At this time, in each of the first and second images, the distance between the added priority feature point pair $P_{a,k}$ and the feature point pair $P_m$ of interest is given by $$d_{1,k}=\|x_{1,m}-x_{1,k}\| \quad (7)$$

$$d_{2,k}=\|x_{2,m}-x_{2,k}\| \quad (8)$$

(S1302)

In step S1302, the influence degree calculation unit 1109 calculates the influence degree of the feature point pair of interest on the added priority feature point pair. Practical processing will be described below. With respect to the distance between the added priority feature point pair $P_{a,k}$ and the feature point pair $P_m$ of interest, an average value $d_k$ of the distances in the first and second images is calculated by:

$$d_k=(d_{1,k}+d_{2,k})/2 \quad (9)$$

The influence degree calculation unit 1109 calculates an influence degree $A_k$ of the feature point pair $P_m$ of interest on the added priority feature point pair $P_{a,k}$ based on the average value $d_k$ of the distances, given by:

$$A_k=1-d_k/(1+d_k) \quad (10)$$

If the average value $d_k$ of the distances is "0", the influence degree calculation unit 1109 obtains "1" as the influence degree $A_k$. If the average value $d_k$ of the distances is infinitely large, the influence degree $A_k$ obtained by the influence degree calculation unit 1109 is infinitely close to "0". Note that in the above description, the influence degree calculation unit 1109 calculates the influence degree based on the average value of the distances in the first and second images. An influence degree calculation method is not limited to this. For example, the influence degree calculation unit 1109 can calculate the influence degree based on one of the distances on the first and second images.

As described above, the influence degree calculation unit 1109 can calculate, for each nonpriority feature point pair, its influence degree on the added priority feature point pair. Furthermore, since the influence degree is a value simply calculated based on the distance between the feature points, the influence degree calculation unit 1109 can obtain the influence degree at low calculation cost.

(Setting of Weights of Feature Point Pairs)

In step S1210, the weight setting unit 110 sets weights for registration for all the feature point pairs based on the matching degree or influence degree of each nonpriority feature point pair. A case in which the process transits from step S1207 to this step (S1210) will be explained first. In this case, the weight setting unit 110 sets a weight $w_{p,i}$ of the priority feature point pair and a weight $w_{n,j}$ of the nonpriority feature point pair by the same setting method as in step S207 (FIG. 2) of the first embodiment. A practical setting method is the same as in step S207 of the first embodiment and a description thereof will be omitted. The weight setting unit 110 stores, in the storage unit (not shown), the set weight $w_{p,i}$ of the priority feature point pair and the set weight $w_{n,j}$ of the nonpriority feature point pair. The stored weight information is newly stored in another area without being overwritten even if the registration loop in steps S1202 to S1213 is executed a plurality of times.

A case in which the process transits from step S1209 to this step (S1210) will be described next. In this case, a method of setting the weight $w_{p,i}$ of the priority feature point pair is the same as in step S207 of the first embodiment and a description thereof will be omitted.

A method of setting the weight $w_{n,j}$ of the nonpriority feature point will be described next. Similarly to step S207 (FIG. 2), let $P_{n,j}$ ($0 \leq j \leq N_n$ where $N_n$ represents the number of nonpriority feature point pairs) be the nonpriority feature point pair.

Let $A_{j,k}$ be the influence degree of the nonpriority feature point pair $P_{n,j}$ on the added priority feature point pair $P_{a,k}$. With respect to the nonpriority feature point, the weight setting unit 110 sets a weight for the nonpriority feature point by comparing the influence degree with a threshold. With respect to the nonpriority feature point pair, the weight setting unit 110 sets a weight for the nonpriority feature point pair by comparing the influence degree with the threshold.

With respect to the nonpriority feature point, if the influence degree is equal to or higher than the threshold, the weight setting unit 110 sets the weight of the nonpriority feature point to zero. With respect to the nonpriority feature point, if the influence degree is lower than the threshold, the weight setting unit 110 sets, as the weight of the nonpriority feature point, a weight used in registration.

With respect to the nonpriority feature point pair, if the influence degree is equal to or higher than the threshold, the weight setting unit 110 sets the weight of the nonpriority feature point pair to zero. If the influence degree is lower than the threshold, the weight setting unit 110 sets, as the weight of the nonpriority feature point pair, a weight used in registration. For example, for all the added priority feature point pairs, if the influence degree $A_{j,k}$ is equal to or higher than a predetermined threshold (for example, 0.8), the weight setting unit 110 sets the weight $w_{n,j}$ of the nonpriority feature point pair $P_{n,j}$ to "0". Consequently, with respect to each nonpriority feature point Pair $P_{n,j}$, if there exists at least one added priority feature point on which the influence degree $A_{j,k}$ is higher than the threshold, the weight $w_{n,j}$ is set to "0".

Let $w_{n,j,yet}$ be the weight $w_{n,j}$ of the nonpriority feature point pair which has not been set to "0" in the above processing, a value is set in $w_{n,j,yet}$ by the following method.

The weight setting unit 110 obtains the information of the weight of the nonpriority feature point pair, which has been stored in the storage unit (not shown) in step S1210 in the last registration loop. This weight is represented by $w_{n,j,old}$. The value of the weight $w_{n,j,yet}$ is set as the value of the corresponding $w_{n,j,old}$. The weight setting unit 110 sets, for each nonpriority feature point pair having a high influence degree and having a given distance or less to the added priority feature point pair, a weight to "0" so as to reduce the influence degree, and sets, for other nonpriority feature point pairs, the weight $w_{n,j,old}$ calculated in the last registration. The registration unit 112 can perform registration based on the weight set by the weight setting unit 110, as described above.

Note that this embodiment has described the arrangement in which if the influence degree $A_{j,k}$ is equal to or higher than the predetermined threshold, the weight setting unit 110 sets the weight $w_{n,j}$ of the nonpriority feature point to zero ("0"); otherwise, the weight setting unit 110 sets a weight used in the last registration. However, a method of setting the weight $w_{n,j}$ of the nonpriority feature point is not limited to this. For example, the weight setting unit 110 can set the weights $w_{n,j}$ of all the nonpriority feature point pairs in accordance with the magnitude of the influence degree $A_{j,k}$. In this case, for example, with respect to the weights $w_{n,j}$ of all the nonpriority feature point pairs, the weight setting unit 110 can calculate the weights $w_{n,j}$ of all the nonpriority feature point pairs by multiplying the weight $w_{n,j,old}$ in the last registration by a value based on the influence degree $A_{j,k}$.

According to this embodiment, when priority feature points are added, it is possible to perform registration by setting a weight for each nonpriority feature point that largely influences the added priority feature points so as to reduce the influence degree, and setting, for each of other nonpriority feature points, an appropriate weight set in the last registration.

According to this embodiment, it is possible to obtain an appropriate registration result in which feature points that the operator wants to match are reliably made to match each other, and unnatural deformation near the feature points is eliminated. Furthermore, unlike the first embodiment, it is possible to readily obtain a deformable registration result at low calculation cost without large calculation cost of calculating displacement fields to calculate a matching degree every time priority feature points are added.

According to the embodiments of the present invention, it is possible to perform, in registration between a plurality of images, appropriate registration even in a region other than feature points that the operator wants to match preferentially.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-026965, filed Feb. 13, 2015, which is hereby incorporated by reference herein in its entirety.

What is claimed is:

1. An image processing apparatus comprising:
   at least one processor and at least one memory coupled to the at least one processor, the at least one memory storing instructions to be executed by the at least one processor to cause the image processing apparatus to perform steps comprising:
   obtaining, among feature points obtained from at least one of a first medical image and a second medical image, priority feature points that are registered preferentially and nonpriority feature points that have priority orders lower than those of the priority feature points to be registered;
   setting a weight of each of the nonpriority feature points based on an evaluation value that evaluates a characteristic of the nonpriority feature point, and setting a weight of each of the priority feature points, that has a value larger than the weight of each of the nonpriority feature points, without depending on an evaluation value that evaluates a characteristic of the priority feature point;
   registering the first medical image and the second medical image using the priority feature points, the weights of the priority feature points, the nonpriority feature points, and the weights of the nonpriority feature points; and
   displaying an image on a display device based on the registration of the first medical image and the second medical image.

2. The image processing apparatus according to claim 1, wherein each of a set of the priority feature points and a set of the nonpriority feature points has a one-to-one correspondence between the first medical image and the second medical image.

3. The image processing apparatus according to claim 1, wherein the instructions to be executed by the at least one processor further cause the image processing apparatus to:
   calculate, as the evaluation value of each of the nonpriority feature points, a matching degree indicating a degree of matching to deformation information between the first medical image and the second medical image defined by other feature points including the priority feature points and other nonpriority feature points.

4. The image processing apparatus according to claim 3, wherein the instructions to be executed by the at least one processor further cause the image processing apparatus to, in the calculating, calculate the matching degree based on information of a displacement field generated based on positions of the priority feature points and the nonpriority feature points.

5. The image processing apparatus according to claim 4, wherein the instructions to be executed by the at least one processor further cause the image processing apparatus to:
   obtain a first displacement field between the first medical image and the second medical image based on the positions of the priority feature points and nonpriority feature points except a nonpriority feature point of interest, and
   obtain a second displacement field between the first medical image and the second medical image based on the positions of the priority feature points and nonpriority feature points including the nonpriority feature point of interest,
   wherein the calculating includes calculating the matching degree of the nonpriority feature point of interest based on a difference between the first displacement field and the second displacement field.

6. The image processing apparatus according to claim 2, wherein the instructions to be executed by the at least one processor further cause the image processing apparatus to calculate, as the evaluation value of each of the nonpriority feature points, an association reliability degree between the first medical image and second medical image with respect to each of the nonpriority feature points.

7. The image processing apparatus according to claim 1, wherein the instructions to be executed by the at least one processor further cause the image processing apparatus to calculate, as the evaluation value of each of the nonpriority feature points, an influence degree of each of the nonpriority feature points on the priority feature point based on a relative positional relationship between the priority feature point and the nonpriority feature point.

8. The image processing apparatus according to claim 7, wherein the instructions to be executed by the at least one processor further cause the image processing apparatus to:
   determine whether registration is unexecuted, by referring to determination information representing whether the registration has been executed, and
   if the registration has been executed, calculate an influence degree of each of the nonpriority feature points on priority feature points newly added after the registration.

9. The image processing apparatus according to claim 7, wherein the instructions to be executed by the at least one processor further cause the image processing apparatus to, in the setting, set a weight of the nonpriority feature point by comparing the influence degree with a threshold.

10. The image processing apparatus according to claim 9, wherein the instructions to be executed by the at least one processor further cause the image processing apparatus to, in the setting:
   if the influence degree is not lower than the threshold, set the weight of the nonpriority feature point to zero, and if the influence degree is lower than the threshold, set a weight used in the registration as the weight of the nonpriority feature point.

11. The image processing apparatus according to claim 1, wherein the instructions to be executed by the at least one processor further cause the image processing apparatus to:
obtain the first medical image and the second medical image;
extract feature points in the first medical image and the second medical image by performing image processing for the first medical image and the second medical image, and
set, as the nonpriority feature points, the extracted feature points.

12. The image processing apparatus according to claim 1, wherein the instructions to be executed by the at least one processor further cause the image processing apparatus to:
cause a display device to display a selection input portion for selecting whether to set the obtained feature points as priority feature points or nonpriority feature points,
set the priority feature points and the nonpriority feature points in accordance with selection of the selection input portion.

13. The image processing apparatus according to claim 12, wherein the instructions to be executed by the at least one processor further cause the image processing apparatus to, in causing the display device to display, causing the display device to display the priority feature points and the nonpriority feature points in different display formats in a cross-sectional image of the first medical image and a cross-sectional image of the second medical image.

14. The image processing apparatus according to claim 12, wherein the instructions to be executed by the at least one processor further cause the image processing apparatus to:
in causing the display device to display, causing the display device to display a priority setting portion in which a priority indicating a priority order for matching the feature points is settable by numerical information, and
in the setting, setting the priority feature points and the nonpriority feature points in accordance with setting of the priority setting portion.

15. An image processing method comprising:
obtaining, among feature points obtained from at least one of a first medical image and a second medical image, priority feature points that are registered preferentially and nonpriority feature points that have priority orders lower than those of the priority feature points to be registered;
setting a weight of each of the nonpriority feature points based on an evaluation value that evaluates a characteristic of the nonpriority feature point, and setting a weight of each of the priority feature points, that has a value larger than the weight of each of the nonpriority feature points, without depending on an evaluation value that evaluates a characteristic of the priority feature point;
registering the first medical image and the second medical image using the priority feature points, the weights of the priority feature points, the nonpriority feature points, and the weights of the nonpriority feature points; and
displaying an image on a display device based on the registration of the first medical image and the second medical image.

16. A non-transitory computer-readable storage medium storing a program for causing a computer to perform an image processing method for an image processing apparatus, the image processing method comprising:
obtaining, among feature points obtained from at least one of a first medical image and a second medical image, priority feature points that are registered preferentially and nonpriority feature points that have priority orders lower than those of the priority feature points to be registered;
setting a weight of each of the nonpriority feature points based on an evaluation value that evaluates a characteristic of the nonpriority feature point, and setting a weight of each of the priority feature points, that has a value larger than the weight of the nonpriority feature points, without depending on an evaluation value that evaluates a characteristic of the priority feature point;
registering the first medical image and the second medical image based on the priority feature points, the weights of the priority feature points, the nonpriority feature points, and the weights of the nonpriority feature points; and
displaying an image on a display device based on the registration of the first medical image and the second medical image.

17. The image processing apparatus according to claim 12, wherein the instructions to be executed by the at least one processor further cause the image processing apparatus to:
cause the display device to display a cross-sectional image of the first medical image and a cross-sectional image of the second medical image side by side as a registration result of the registering, and
designate a set of corresponding feature points as input feature points in the cross-sectional image of the first medical image and the cross-sectional image of the second medical image.

* * * * *